June 6, 1961 W. W. HANNON 2,987,673
ELECTRICAL CIRCUIT ANALYZER
Filed Jan. 22, 1958 14 Sheets-Sheet 1
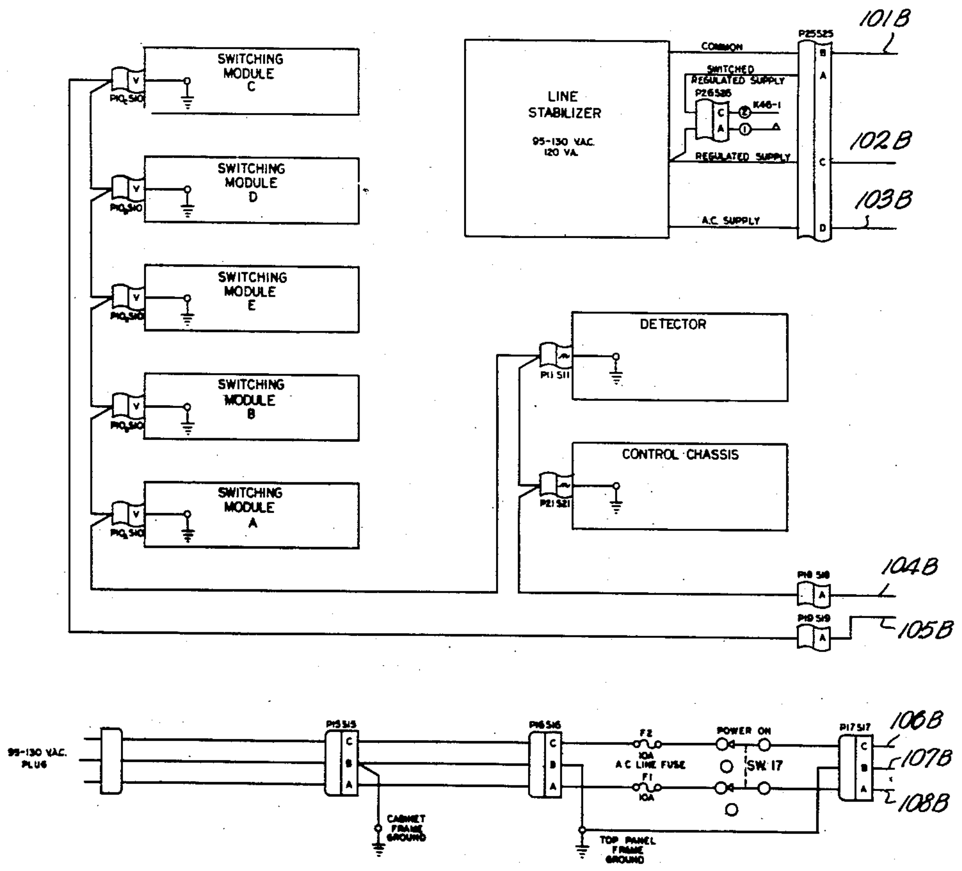
Fig. 1-A
INVENTOR.
William W. Hannon
BY
ATTORNEY.

June 6, 1961 W. W. HANNON 2,987,673
ELECTRICAL CIRCUIT ANALYZER
Filed Jan. 22, 1958 14 Sheets-Sheet 2
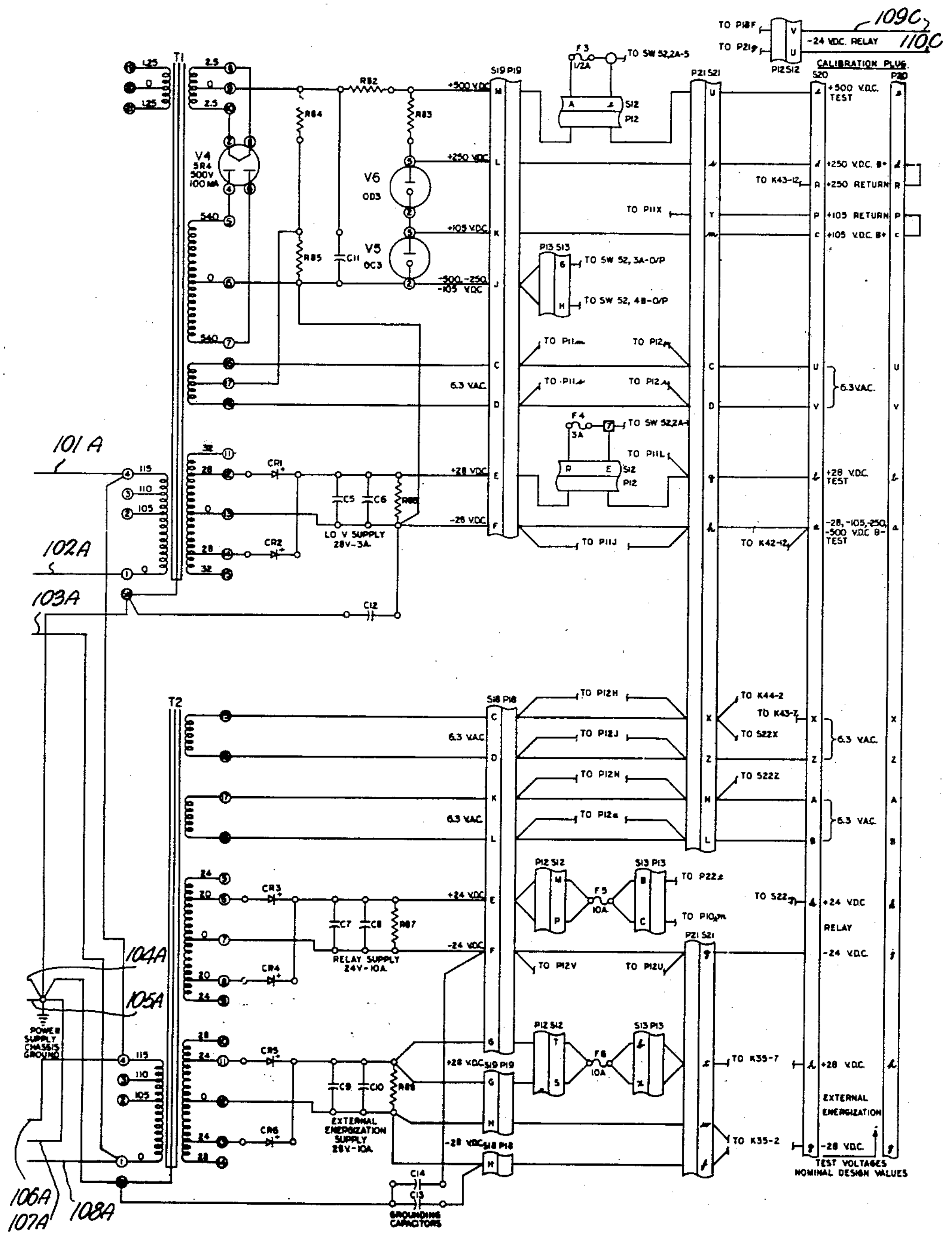
Fig. 1-B
INVENTOR.
William W. Hannon
BY [signature]
ATTORNEY.

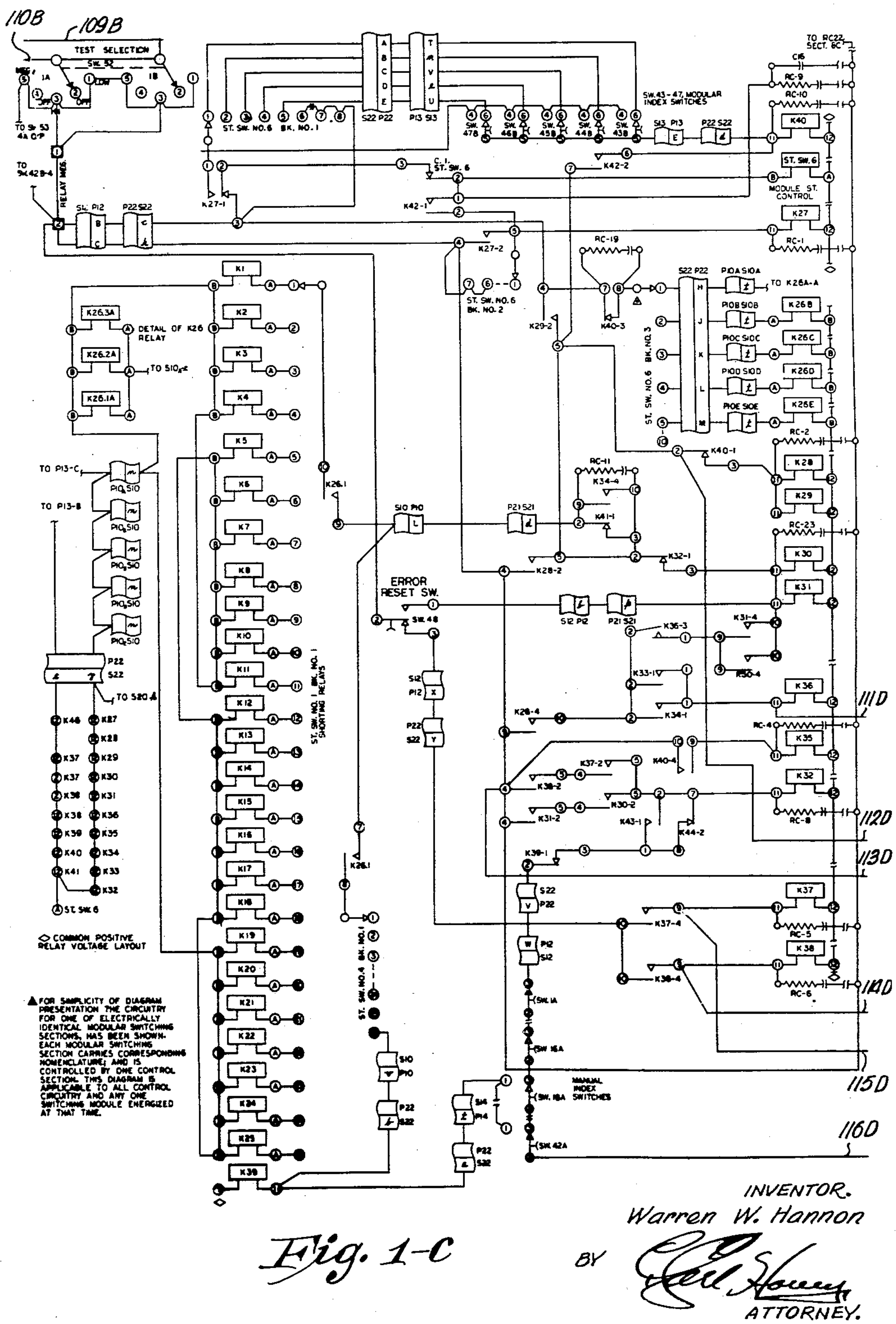
Fig. 1-C
INVENTOR.
Warren W. Hannon
BY [signature]
ATTORNEY.

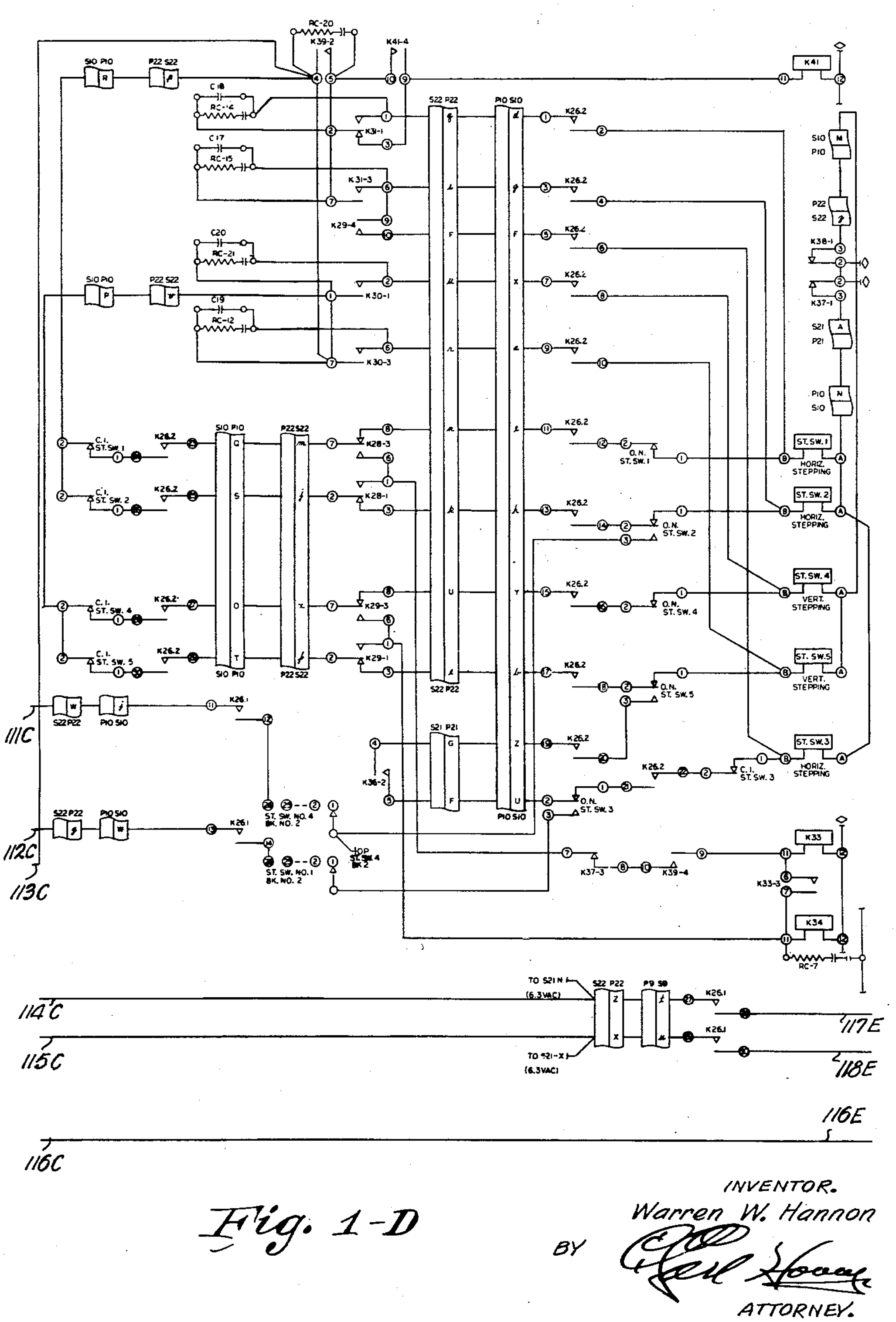
Fig. 1-D
INVENTOR.
Warren W. Hannon
BY [signature]
ATTORNEY.

June 6, 1961 W. W. HANNON 2,987,673
ELECTRICAL CIRCUIT ANALYZER
Filed Jan. 22, 1958 14 Sheets-Sheet 5
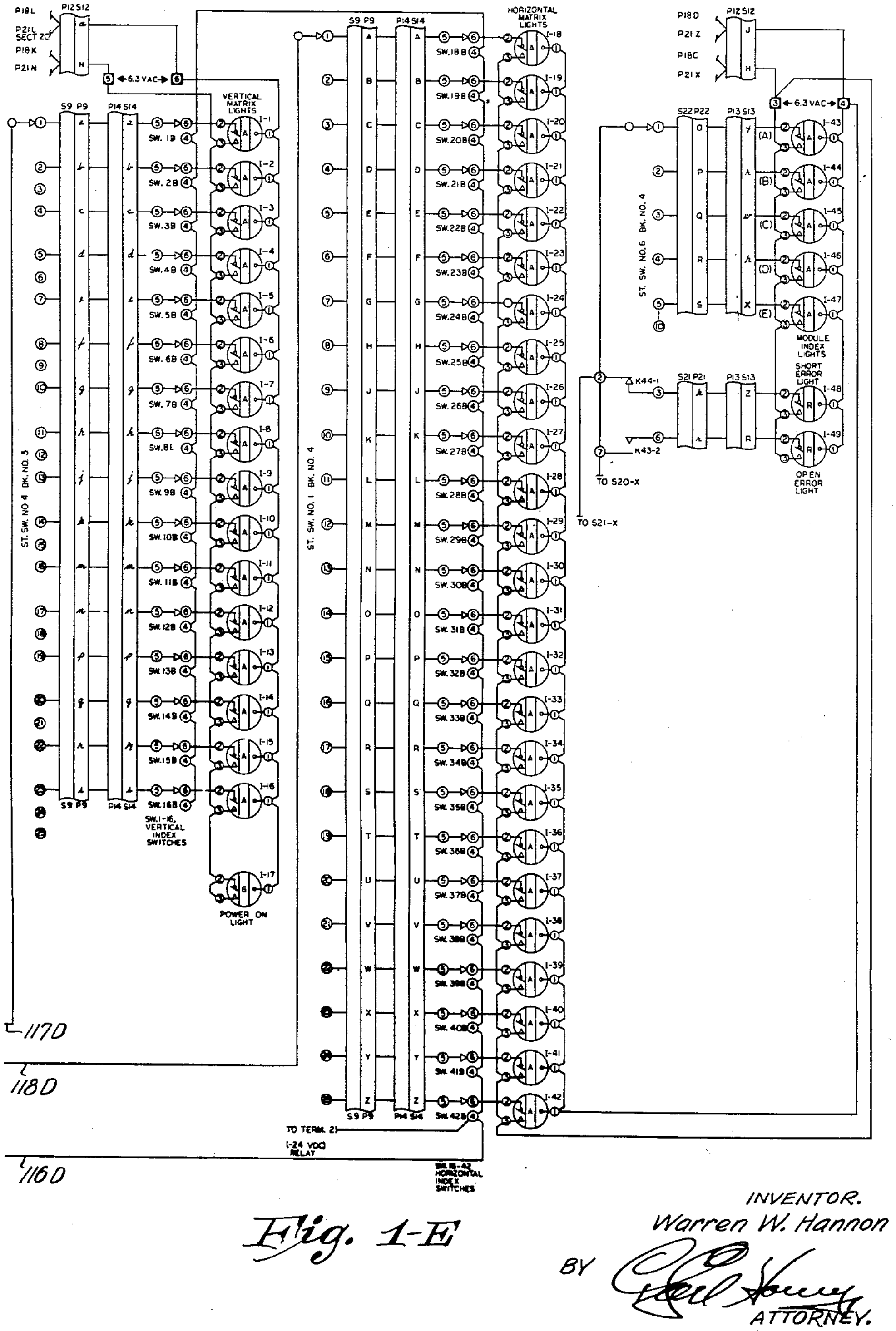
Fig. 1-E
INVENTOR.
Warren W. Hannon
BY [signature]
ATTORNEY.

June 6, 1961 W. W. HANNON 2,987,673
ELECTRICAL CIRCUIT ANALYZER
Filed Jan. 22, 1958 14 Sheets-Sheet 6
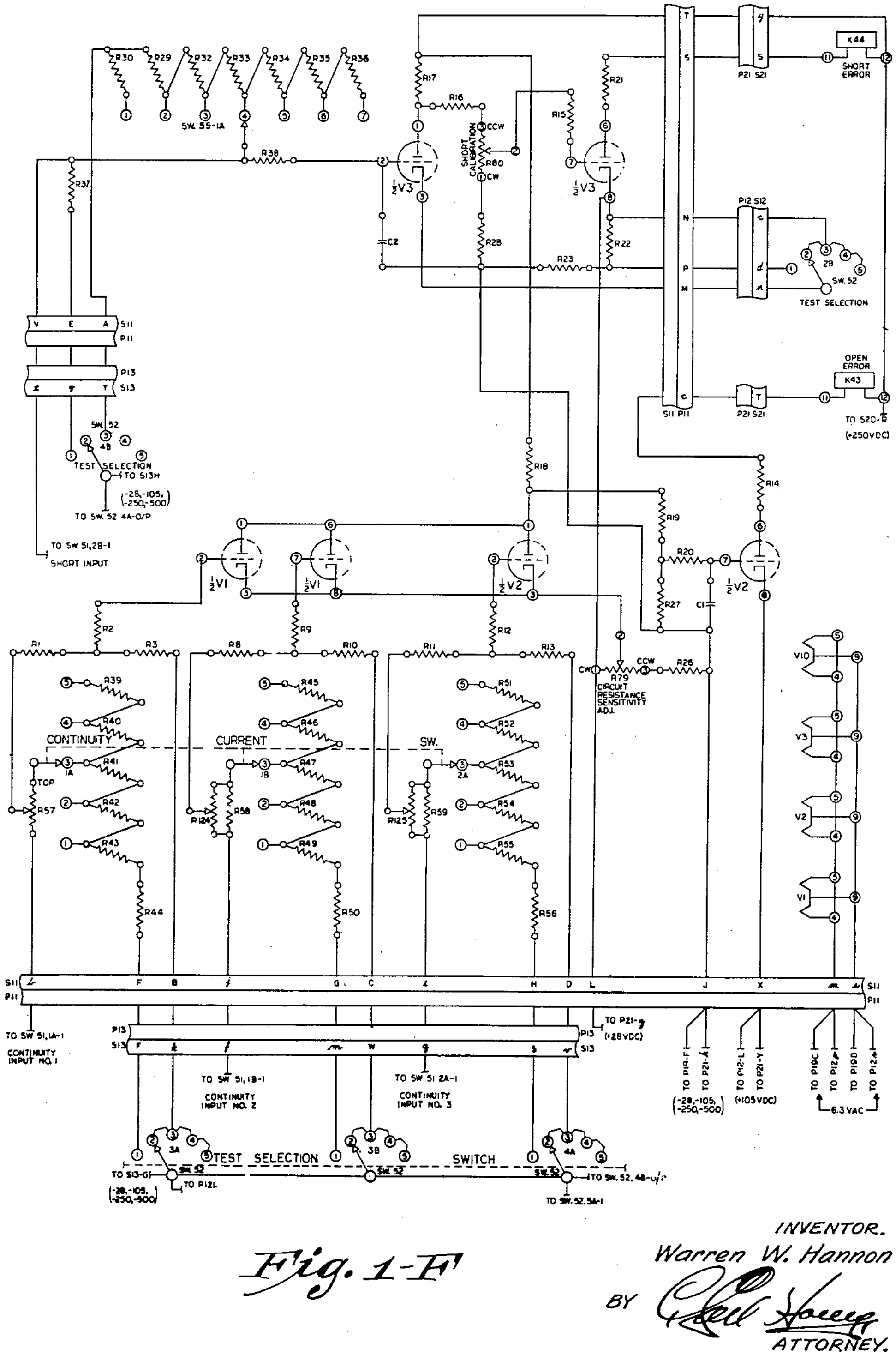
Fig. 1-F
INVENTOR.
Warren W. Hannon
BY [signature]
ATTORNEY.

June 6, 1961 W. W. HANNON 2,987,673
ELECTRICAL CIRCUIT ANALYZER
Filed Jan. 22, 1958 14 Sheets-Sheet 7
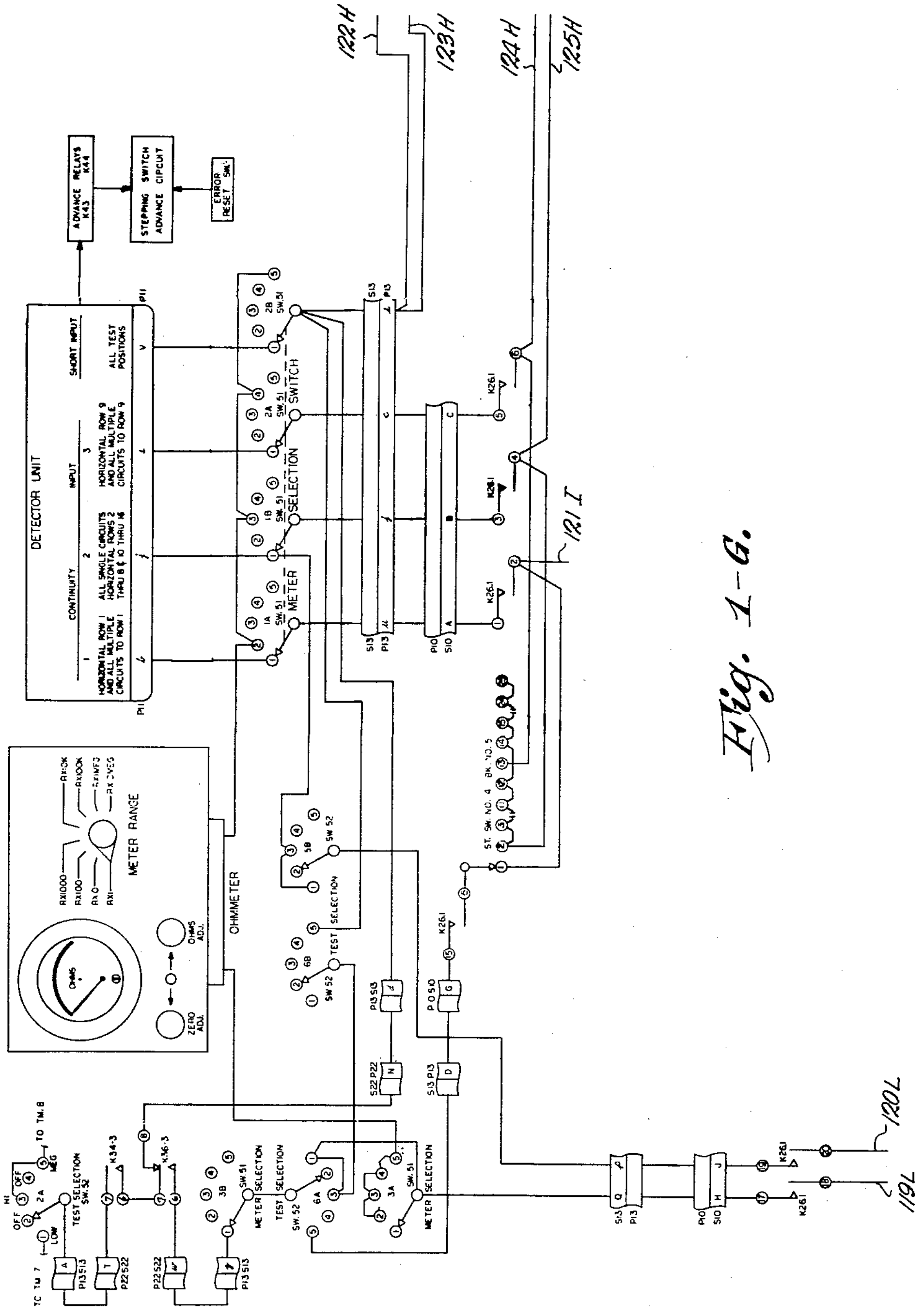
Fig. 1-G.
INVENTOR.
Warren W. Hannon
BY [signature]
ATTORNEY.

June 6, 1961 W. W. HANNON 2,987,673
ELECTRICAL CIRCUIT ANALYZER
Filed Jan. 22, 1958 14 Sheets-Sheet 8
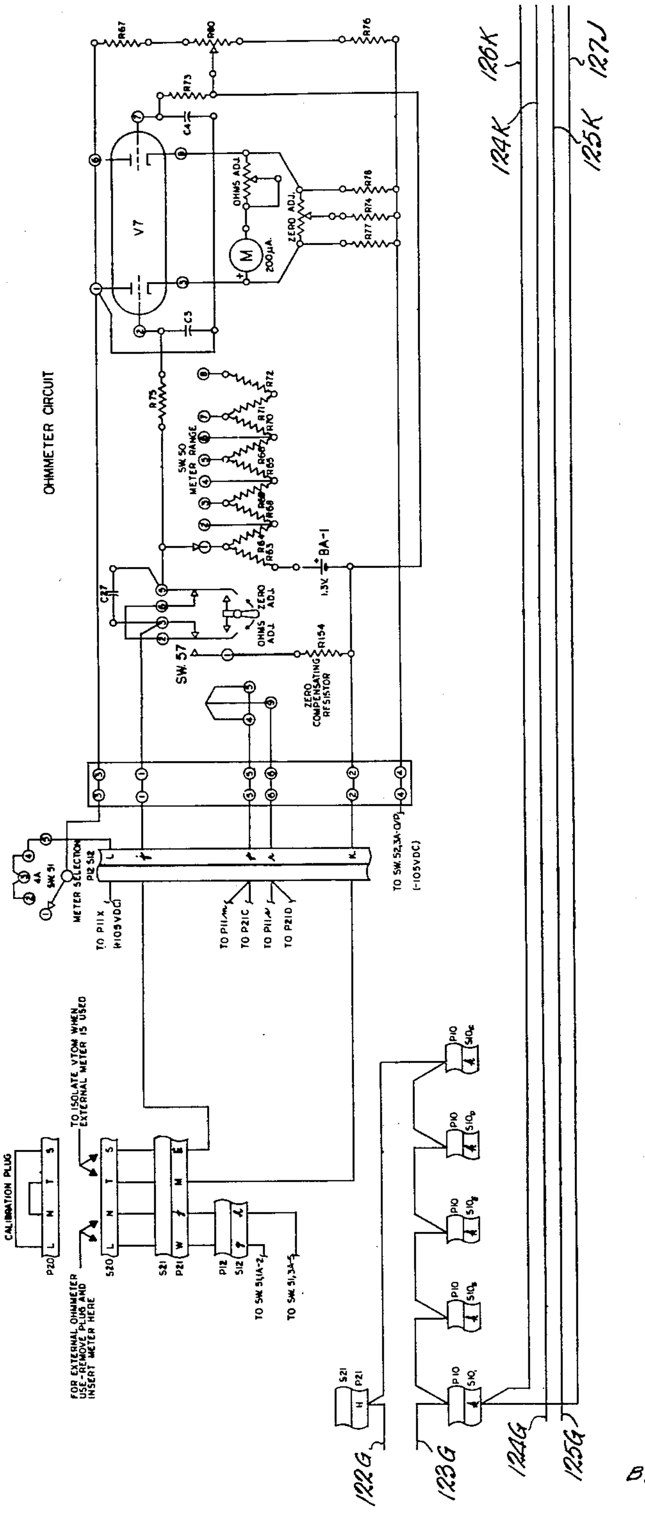
Fig. 1-H
INVENTOR.
Warren W. Hannon
BY [signature]
ATTORNEY.

June 6, 1961 W. W. HANNON 2,987,673
ELECTRICAL CIRCUIT ANALYZER
Filed Jan. 22, 1958 14 Sheets-Sheet 9
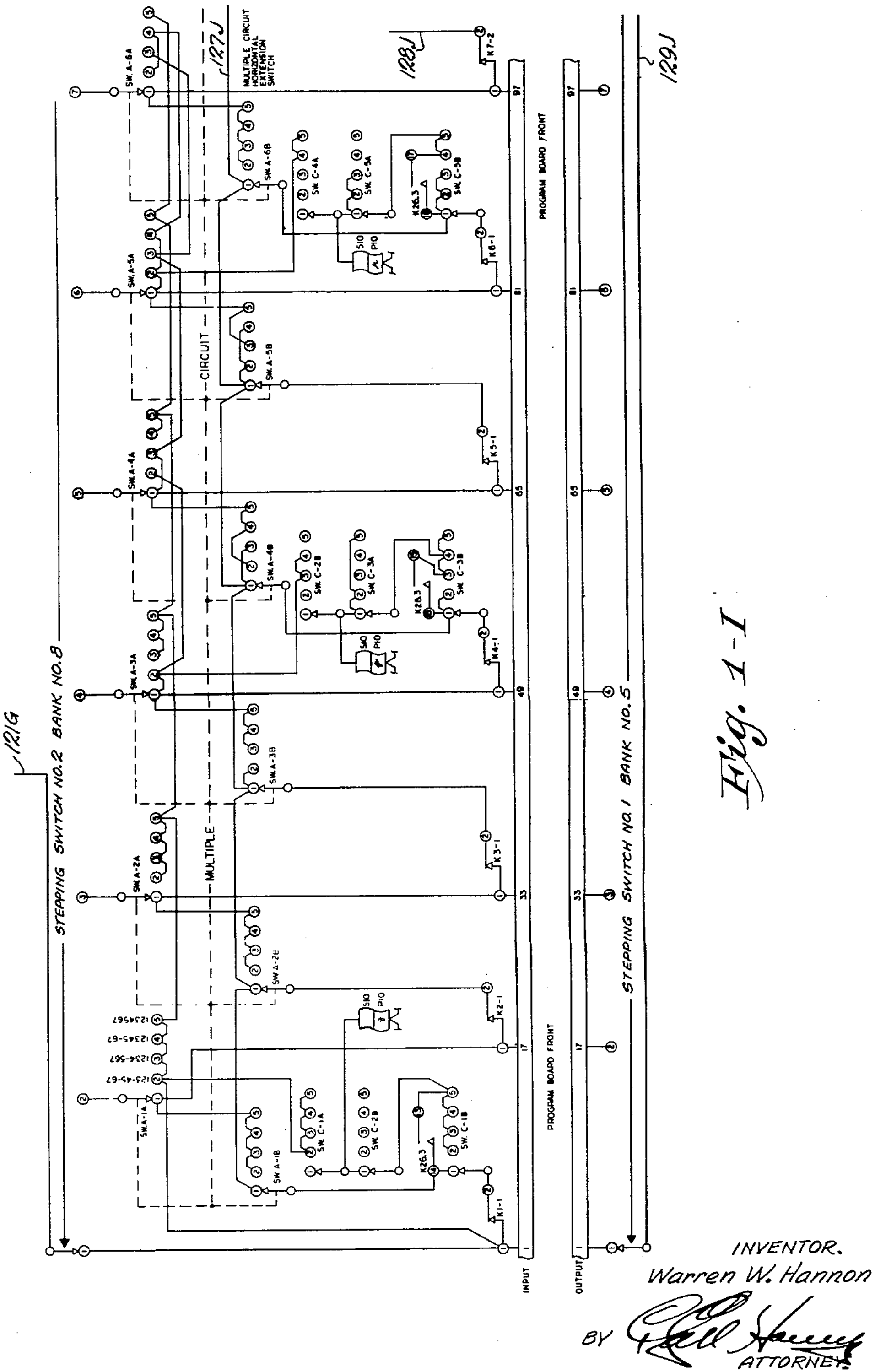
Fig. 1-I
INVENTOR.
Warren W. Hannon
BY [signature]
ATTORNEY

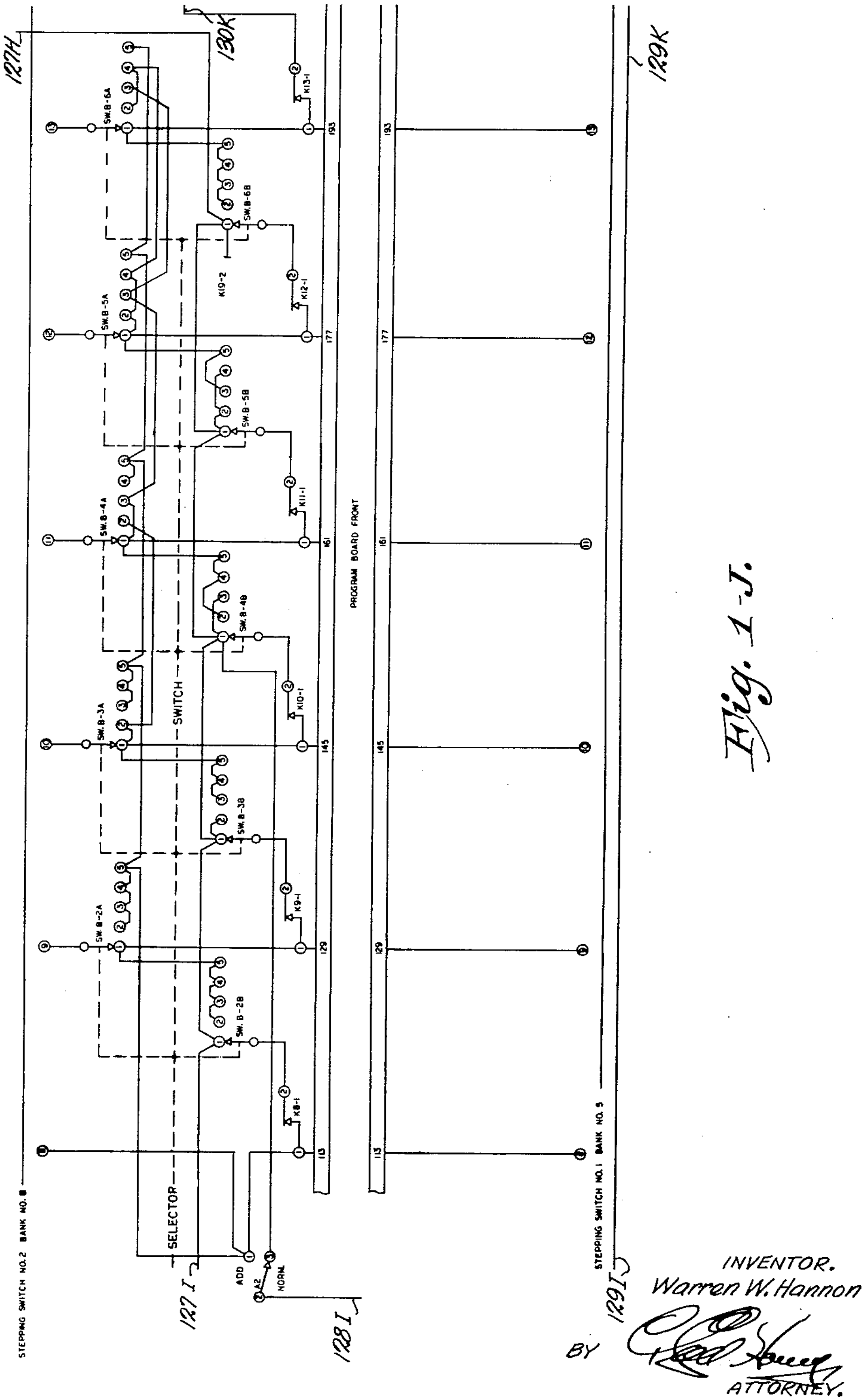
Fig. 1-J.
INVENTOR.
Warren W. Hannon
BY
ATTORNEY.

June 6, 1961 W. W. HANNON 2,987,673
ELECTRICAL CIRCUIT ANALYZER
Filed Jan. 22, 1958 14 Sheets-Sheet 11
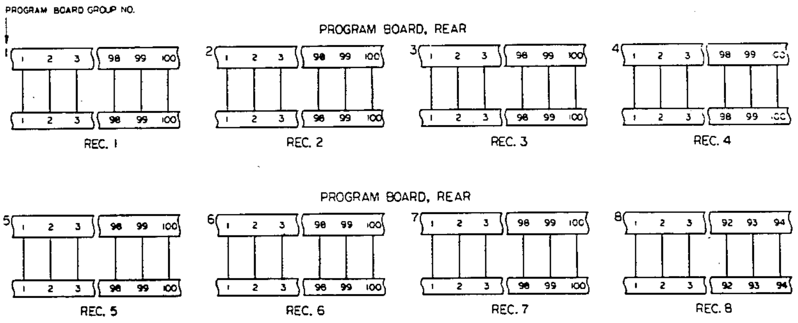
Fig. 2.
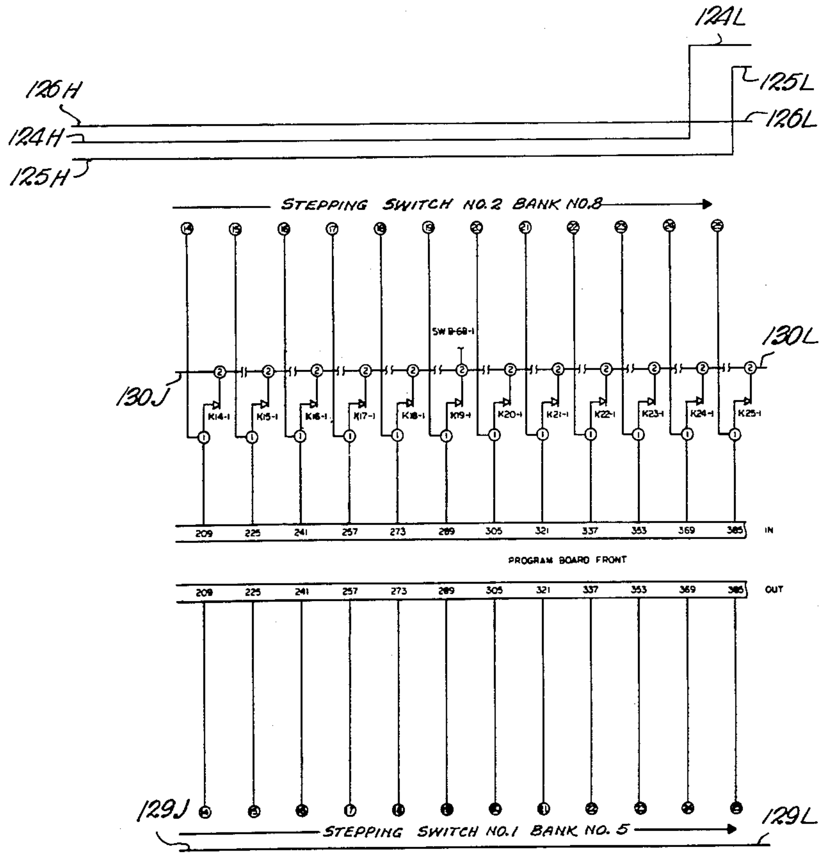
Fig. 1-K.
INVENTOR.
Warren W. Hannon
BY
ATTORNEY.

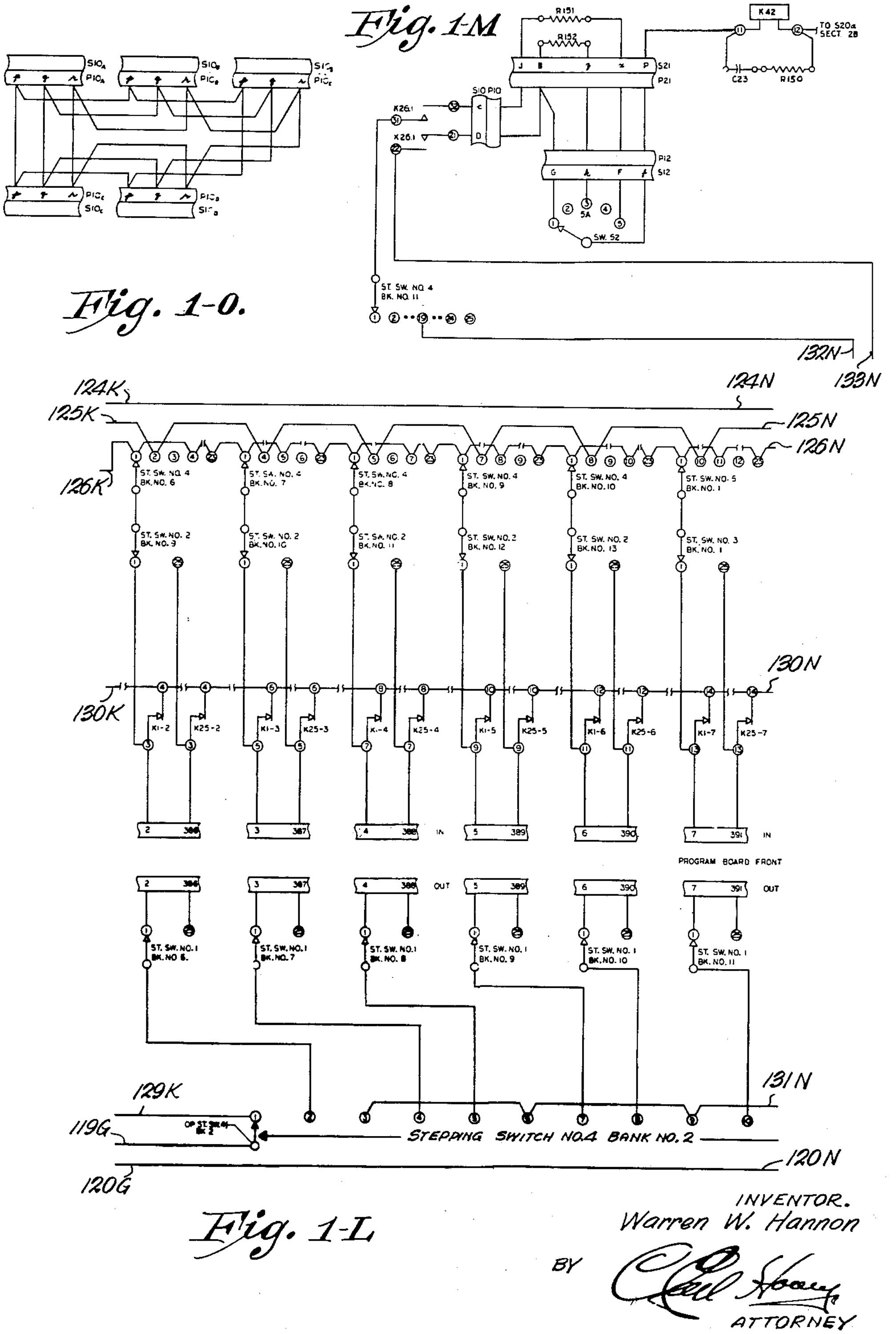
Fig. 1-M, Fig. 1-O, Fig. 1-L
INVENTOR.
Warren W. Hannon
BY [signature]
ATTORNEY June 6, 1961 W. W. HANNON 2,987,673
ELECTRICAL CIRCUIT ANALYZER
Filed Jan. 22, 1958 14 Sheets-Sheet 13
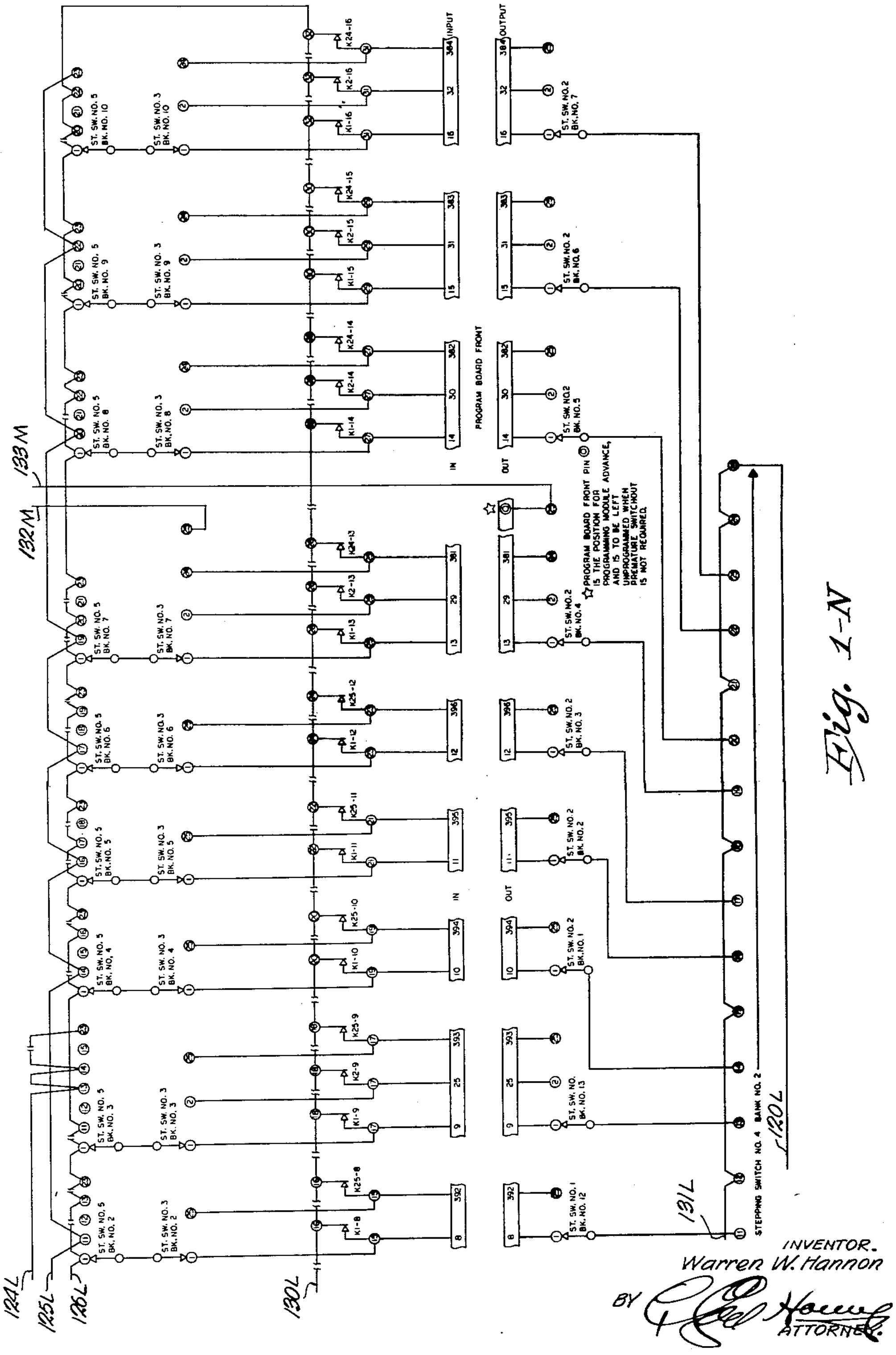
Fig. 1-N
INVENTOR.
Warren W. Hannon
BY
ATTORNEY.

June 6, 1961 W. W. HANNON 2,987,673
ELECTRICAL CIRCUIT ANALYZER
Filed Jan. 22, 1958 14 Sheets-Sheet 14
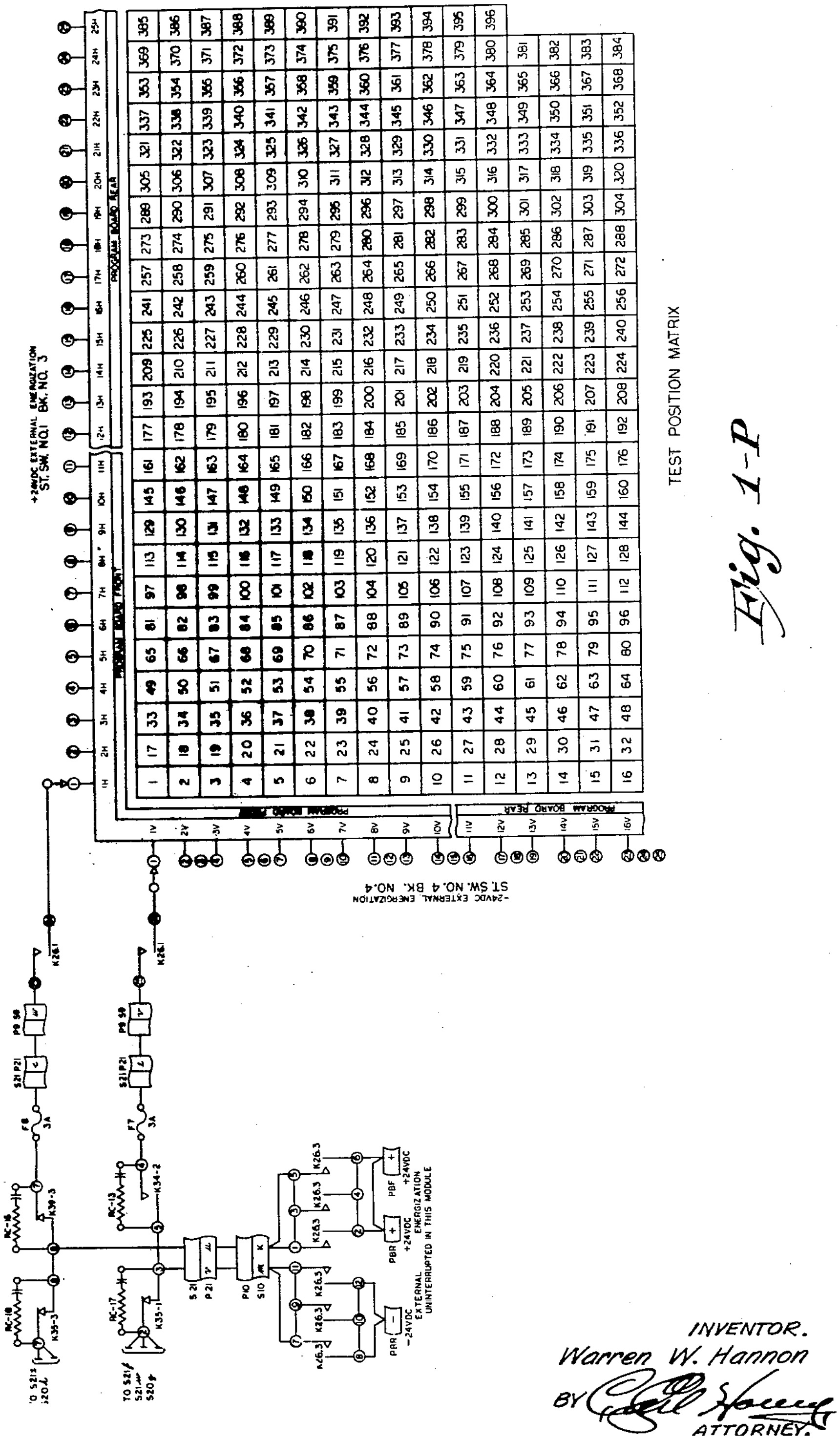
Fig. 1-P
INVENTOR.
Warren W. Hannon
BY [signature]
ATTORNEY.

United States Patent Office 2,987,673

Patented June 6, 1961

2,987,673
ELECTRICAL CIRCUIT ANALYZER

Warren W. Hannon, Olathe, Kans., assignor to Dit-Mco, Inc., Kansas City, Mo., a corporation of Missouri Filed Jan. 22, 1958, Ser. No. 710,466
6 Claims. (Cl. 324—73)

This invention relates generally to apparatus for automatically testing electrical equipment having a multiplicity of circuit terminations. More specifically, this invention relates to improvements over the apparatus disclosed in my co-pending application Serial No. 472,487, filed December 1, 1954, and entitled "Electrical Circuit Analyzer," now U.S. Letters Patent No. 2,849,677, and to improvements over the combination with said last-mentioned apparatus of the apparatus disclosed in my copending application Serial No. 558,056, filed January 9, 1956, entitled "Automatic Circuit Capacity Multiplying Apparatus for Electrical Circuit Analyzer," now U.S. Letters Patent No. 2,849,678, in the manner suggested in said last-named application.

The apparatuses disclosed in my aforesaid applications have proved highly satisfactory for many types of circuit testing work and, in fact, are now in successful and widespread use by various governmental agencies and many of the major producers of aircraft and missiles in this country. Despite their wide acceptance and satisfactory performance, however, such previously disclosed apparatuses are subject to certain limitations, which I have found may be overcome, and to certain complexities having an important practical effect on the costs of producing such apparatus (particularly where same must be adapted for testing equipment having an unusually great number of circuit terminations), which I have also found may be eliminated.

Accordingly, it is the primary object of this invention to provide improved electrical circuit analyzer apparatus in which such limitations and complexities inhering in my said previously disclosed apparatus are eliminated.

In general, the improvements contemplated by this invention variously involve either the addition to or the substitution in the analyzer apparatus disclosed by my said application Serial No. 472,487 of certain different and novel, concepts, structures and relationships, while other concepts, structures and relationships incorporated in said previously disclosed analyzer apparatus are carried over without change into the improved analyzer apparatus contemplated by the present invention. Accordingly, both in the notation of more specific objects of the present invention that follow and in the subsequent detailed description of the invention, it is believed most proper to concentrate upon those concepts, structures, relationships and results which differ from and constitute improvements over those involved and described in my said application Serial No. 472,487. The disclosure of said last-mentioned application is, therefore, incorporated herein by reference and relied upon in supplement to this disclosure for explanation of those concepts, structures, relationships and results which are common to the overall apparatuses of both the present and said previously disclosed invention, it being noted that such concepts, structures, relationships and results which are common to both apparatuses have now become known or available to those skilled in the art through the mentioned widespread public use of equipment utilizing same and the distribution of service manuals and the like disclosing and describing same. It may be further observed that, although reference is also made herein to the disclosure of my said application Serial No. 558,056 for purposes of comparison and an appreciation of the significance of certain improvements contemplated by the present invention, the mentioned improvements incorporated in the new analyzer apparatus itself serve in lieu of the circuit capacity multiplying apparatus disclosed in said last-mentioned application and eliminate the need for employment of such multiplying apparatus without sacrificing capacity.

Among the important specific objects of the present invention are the provision of improved electrical circuit testing apparatus in which:

(1) A plurality of circuit selecting units, each having a relatively great number of terminations of external circuits to be tested coupled therewith, can have their test output terminals automatically, successively and in accordance with individualized, internal programming, or manually and selectively, coupled with a circuit defect detecting unit, thereby providing for the testing of a great multitude of external circuits handled by sub-groups thereof each including a substantial number of circuit terminations, without the necessity of switching between the sets of numerous external circuit terminations associated with the various sub-groups as is necessary with the circuit capacity multiplying apparatus of my said application Serial No. 558,056;

(2) An increased number of external circuits of the multiple circuit type (that is, circuits having a single input termination common to a plurality of individual output terminations), or external multiple circuits having an increased number of output terminations, can be handled with a testing matrix system and control switching means of given complexity, as compared with the analyzer apparatus of my said application Serial No. 472,487; and (3) There is built in to the analyzer apparatus as an internal part thereof means for automatically presenting an artificial, defect indicating signal to the circuit defect detecting unit initially upon switching to any set of external circuit terminations to be tested, which must be positively overcome by a no defect condition in such terminations before the apparatus will automatically switch to the next set of terminations to be tested, as contrasted with the absence of such feature in the analyzer apparatus of my said application Serial No. 472,487.

Still other important objects of this invention, including various sub-facets of those somewhat generally stated above, will be made clear or become apparent from the accompanying drawings and the more detailed description of the invention which follows:

In the accompanying drawings:

FIGURES 1–A, 1–B, 1–C, 1–D, 1–E, 1–F, 1–G, 1–H, 1–I, 1–J, 1–K, 1–L, 1–M, 1–N, 1–O and 1–P together constitute a fragmentary, schematic and diagrammatic representation of a currently preferred embodiment of analyzer contemplated by this invention, certain cumulative and duplicative portions of the apparatus being omitted, as will be apparent and is hereinafter more specifically noted; and FIG. 2 is a fragmentary, schematic representation of a typical layout of connections which may be used with the patchcords provided for connecting the terminals of the program boards with the receptacles which receive the external circuit terminations of the equipment to be tested.

It may be noted that the disclosure of my said previously filed applications, both as to the drawings and the descriptions of illustrative embodiments therein, were directed to contracted versions of the corresponding commercial apparatuses, in order to more expeditiously convey an understanding of the basic systemic relationships involved, while the accompanying drawings show for an illustrative example an actual commercial embodiment of the apparatus contemplated by the present invention which is adapted for the automatic testing of up to 1980 single (that is, two termination) circuits, since the significance and functioning of certain facets of this invention can best be understood in relation to the peculiar complexities of apparatus for handling a multitude of circuit terminations. Accordingly, in view of the extent and complexity of even a fragmentary, diagrammatic representation of such apparatus, it has been found necessary to arrange the accompanying drawings somewhat differently than in said application Serial No. 472,487, in order to avoid a hopelessly involved maze of intersecting and sheet-crossing lines representing electrical connections between remotely illustrated components. Nevertheless, those skilled in the art will perceive the identity of principle and substantial identity of structure (except for the expansion by repetition of parts) between many portions of the apparatus of the present invention and the corresponding portions of the apparatus disclosed in my said application Serial No. 472,487.

In the accompanying drawings, certain internal circuit connections between components which are substantially spaced apart or appear on different sheets are indicated by interrupted leads having at each extremity of the interruption thereof an abbreviated legend indicating the circuit point or component to which it is oppositely connected. For example, an interrupted lead connected with terminal V of plug P12 adjacent the upper right-hand corner of FIG. 1–B terminates with the legend "TO P18F," while an interrupted lead connected with terminal F of plug 18 adjacent the lower center part of FIG. 1–B terminates with the legend "TO P12V," indicating an electrical connection between such points. Leads extending between sheets of the drawings have been assigned reference numerals between 101 and 133 inclusive, to which have been added suffix letters indicating the sheet of FIG. 1 where such lead is continued.

In view of practical space limitations in the drawings, and in order to render the disclosure most understandable without cluttering the drawings, employing needless multitude of reference characters, or making the specification interminably long, resort has been had to the system of "numbering" for reference purposes only the component parts themselves and their various terminals, and of using letter-number combinations which constitute abbreviations by which the nature of the component may be readily recognized from its reference designation, illustrated, obvious connections between components within a given sheet of the drawings being identified in the specification only by their terminations. In such reference designations: "P" indicates a plug, and the suffix numeral associated therewith indicates the particular plug intended; "S" and a suffix numeral indicates a particular socket; "T" and a suffix numeral indicates a particular transformer; "K" and a suffix numeral indicates a particular relay coil; "K" and a suffix numeral followed by a further hyphenated or decimal suffix numeral indicates a particular switch of the corresponding relay; "R" and a suffix numeral indicates a particular resistance; "C" and a suffix numeral indicates a particular capacitor; "CR" and a suffix numeral indicates a particular copper oxide rectifier; "F" and a suffix numeral indicates a particular fuse; "SW." and a suffix numeral indicates a particular switch; "ST.SW." and a numeral indicates a particular stepping switch whose various banks are each further indicated by "BK" and a numeral; "I" and a suffix numeral indicates a particular indicator lamp; "V" and a suffix numeral indicates a particular vacuum tube; etc. In a few of the reference designations, subscript letters have been added to indicate the particular switching nodule or unit of which the component is a part. Certain explanatory legends have also been used in the drawings to further clarify the disclosure.

Before proceeding to a discussion of specific improvements, notation of more general aspects of the overall apparatus would seem in order. Broadly, the apparatus contemplated by the invention includes:

(1) Power supply and distribution means as shown in FIGS. 1–A and 1–B, which includes the connections from main power switch SW. 17, which is fed from the 95–130 volt A.C. plug through connectors P15—S15, P16—S15 and fuses F1 and F2, through connector P17—S17 to the primary of transformer T2; the further connections through connector P25—S25 and the line stabilizer shown in FIG. 1–A to the primary of transformer T1; the rectifying and filtering arrangements respectively associated with certain secondaries of transformers T1 and T2; and the voltage distribution system presented by the connections of such transformers T1 and T2 and their associated rectifying and filtering circuits to connectors S18—P18, S19—P19, S21—P21, S20—P20 and the indicated portions of connectors P12—S12 and P13—S13 shown in FIG. 1–B.

(2) Manual control means including the main power switch SW. 17 in FIG. 1–A; the test selection switch SW. 52 having banks 1A and 1B in FIG. 1–C, banks 2B, 3A, 3B, 4A and 4B in FIG. 1–F, banks 2A, 5B, 6A and 6B in FIG. 1–G, and bank 5A in FIG. 1–M; modular index switches SW. 43B, SW. 44B, SW. 45B, SW. 46B and SW. 47B in FIG. 1–C; vertical index switches SW. 1A through SW. 16A inclusive in FIG. 1–C (only the first and latter of which are illustrated) and their associated switch parts SW. 1B through SW. 16B in FIG. 1–E; horizontal index switches SW. 18A through 42A inclusive in FIG. 1–C (only the first and latter of which are illustrated) and their associated switch parts SW. 18B through SW. 42B in FIG. 1–E; error reset switch SW. 48 in FIG. 1–C; the filament testing switches built into each of the indicator lamp assemblies I–1 through I–49 inclusive in FIG. 1–E; the detector unit grid bias adjusting switch SW. 55–1A of FIG. 1–F; the banks 1A, 1B and 2A of the continuity current switch in FIG. 1–F; the meter selection switch SW. 51 having banks 1A, 1B, 2A, 2B, 3A and 3B in FIG. 1–G and bank 4A in FIG. 1–H; the ohmmeter adjust switch SW. 57 in FIG. 1–H; the meter range switch SW. 50 in FIG. 1–H; the multiple circuit selector switch SW. A for each of the circuit switching units referred to under 6, below, having banks A–1A, A–2A, A–3A, A–4A, A–5A, A–6A, A–1B, A–2B, A–3B, A–4B, A–5B, and A–6B in FIG. 1–I; the multiple circuit selector switch SW. B for each of the circuit switching units referred to under 6, below, having banks B–2A, B–3A, B–4A, B–5A, B–6A, B–2B, B–3B, B–4B, B–5B and B–6B in FIG. 1–J; the multiple circuit vertical extension switch SW. C for each of the circuit switching units referred to under 6, below, having banks C–1A, C–2A, C–1B, C–2B, C–3A, C–3B, C–4A, C–5A and C–5B in FIG. 1–I; the multiple circuit horizontal extension switch A–2 for each of the circuit switching units referred to under 6, below, shown in FIG. 1–J; and the various illustrated connections therewith;

(3) Circuit fault detecting means illustrated diagrammatically by an appropriately labeled box in FIGS. 1–A and 1–G, and shown schematically in FIG. 1–F;

(4) Circuit fault indicating and analyzing means including the indicator lamp assemblies I–48 and I–49 in FIG. 1–E; and the ohmmeter illustrated diagrammatically by an appropriately labeled box in FIG. 1–G, and shown schematically in FIG. 1–H;

(5) External circuit connecting means for each of the circuit switching units referred to under 6, below, including: multi-terminal receptacles, as at REC 1 to REC 8 inclusive in FIG. 2, adapted for having terminations of external circuits to be tested coupled therewith by any suitable means such as cables (not shown); multi-terminal program boards separated into correspondingly terminalled input and output connection program boards, whose fronts are appropriately labeled and fragmentarily illustrated in FIGS. 1–I, 1–J, 1–K, 1–L and 1–N, and whose rears are so labeled and fragmentarily illustrated in FIG. 2; and patch cord connections between such receptacles and such program board rears, an exemplary arrangement of which is shown in FIG. 2;

(6) A plurality of circuit switching modules or units, as indicated diagrammatically at A, B, C, D and E in FIG. 1–A, each of which includes, as illustrated for only one of the identical modules (A), switching means including: the contacts of horizontal scanning switch ST.SW. No. 1 (whose BK No. 1 contacts are shown in FIG. 1–C, BK No. 2 contacts are shown in FIG. 1–D, BK No. 3 contacts are shown in FIG. 1–P, BK No. 4 contacts are shown in FIG. 1–E, BK No. 5 contacts are shown in FIGS. 1–I, 1–J and 1–K, BK Nos. 6 through 11 inclusive contacts are shown in FIG. 1–L, BK Nos. 12 and 13 contacts are shown in FIG. 1–N, circuit interrupter contacts CI are shown in FIG. 1–D, and off normal contacts ON are shown in FIG. 1–D); the contacts of horizontal scanning switch ST.SW. No. 2 (whose BK Nos. 1 through 7 inclusive contacts are shown in FIG. 1–N, BK No. 8 contacts are shown in FIGS. 1–I, 1–J and 1–K, BK Nos. 9 through 13 inclusive contacts are shown in FIG. 1–L and circuit interrupter contacts CI and off normal contacts ON are shown in FIG. 1–D); the contacts of horizontal scanning switch ST.SW. No. 3 (whose BK No. 1 contacts are shown in FIG. 1–L, BK Nos. 2 through 10 inclusive contacts are shown in FIG. 1–N, and circuit interrupter contacts CI and off normal contacts ON are shown in FIG. 1–D); the contacts of vertical scanning switch ST.SW. No. 4 (whose BK No. 1 contacts are shown in FIG. 1–C, BK No. 2 contacts are shown in FIG. 1–D, BK No. 3 contacts are shown in FIG. 1–E, BK No. 4 contacts are shown in FIG. 1–P, BK No. 5 contacts are shown in FIG. 1–G, BK Nos. 6 through 10 inclusive contacts are shown in FIG. 1–L, BK No. 11 contacts are shown in FIG. 1–M, and circuit interrupter contacts CI and off normal contacts ON are shown in FIG. 1–D); the contacts of vertical scanning switch ST.SW. No. 5 (whose BK No. 1 contacts are shown in FIG. 1–L, BK Nos. 2 through 10 inclusive contacts are shown in FIG. 1–N, and circuit interrupter contacts CI and off normal contacts ON are shown in FIG. 1–D); the operating coils for such scanning switches identified as ST.SW. 1 through 5 inclusive in FIG. 1–D; shorting relays K–1 through K–25 inclusive (whose operating coils are shown in FIG. 1–C and whose switching contacts are shown in FIGS. 1–I, 1–J, 1–K, 1–L and 1–N); a bar relay K–26 (such relays being shown for each of the switching modules A, B, C, D and E and respectively designated K–26A, K–26B, K–26C, K–26D and K–26E in FIG. 1–C), which may actually consist of a number of paralleled relays as at K26.1A, K26.2A and K26.3A in order to secure sufficient contacts, and whose contacts are illustrated in FIGS. 1–C, 1–D, 1–G, 1–I, 1–M and 1–P; and the various illustrated connections therewith, it being observed that switching means provided in each of the individual modules A, B, C, D and E is generally separated from the control parts of the apparatus common thereto by the sockets and plugs S10 and P10;

(7) Control switching means operable, in conjunction with the intra-module switching means described in 6, above, for controlling intra-module circuit scanning, test pulse application and the like, such means including control relays K–28, K–29, K–30, K–31, K–32, K–35, K–36, K–37 (horizontal locking relay), K–38 (vertical locking relay) and K–39 (off normal relay), whose operating coils are shown in FIG. 1–C and contacts are shown in FIGS. 1–C, 1–D and 1–P; relays K–33 and K–34, whose operating coils are shown in FIG. 1–D and contacts are shown in FIGS. 1–C, 1–D and 1–P; open circuit error relay K–43 and short circuit error relay K–44, whose operating coils are shown in FIG. 1–F and contacts are shown in FIGS. 1–C and 1–E; and the various illustrated connections therewith;

(8) Inter-module selection control switching means including module selector stepping switch ST.SW. 6 which has its operating coil in FIG. 1–C, its banks BK No. 1, BK No. 2 and BK No. 3 in FIG. 1–C and its bank BK No. 4 in FIG. 1–E; control relays K–27, K–40 (module advance slave relay), and K–42 (modular section advance relay); and the various illustrated connections therewith; and (9) Circuit-under-test indicating means including the test position matrix chart shown in FIG. 1–P; the vertical test position indicating lamp assemblies I–1 through I–6 inclusive and the horizontal test position indicating lamp assemblies I–18 through I–42 inclusive, which are shown in FIG. 1–E, although it will be understood that same are physically disposed along a vertical and a horizontal margin of the matrix chart of FIG. 1–P; the module-in-operation indicating lamp assemblies I–43 through I–47 inclusive shown in FIG. 1–E; and the various illustrated connections therewith.

Those skilled in the art, who will be familiar with the nature and operation of the widely used apparatus disclosed in my said prior application Serial No. 472,487, will immediately recognize the many points of substantial identity between such previously disclosed apparatus and the corresponding portions of the improved apparatus which is the subject of this invention; the material differences therebetween will be hereinafter described in specific terms explaining the same in such manner that their nature and significance as improvements over my prior apparatus will be clear. Reference may be made to my concurrently filed application Serial No. 49,358, entitled "Electrical Circuit Testing Device," for an accurate impression of a suitable form of housing and arrangement of manual controls and indicator and connector components for the apparatus of this invention, since it discloses the appearance of a current commercial embodiment of the utilitarian invention disclosed herein.

Finally, before proceeding to a more detailed explanation of the specific improvements contemplated by this invention, however, it will be helpful to further summarize certain aspects of the apparatus, general organization, purposes and operation.

Like the apparatus of my prior application Serial No. 472,487, the present apparatus is adapted for automatically scanning or successively coupling into the apparatus terminations of external circuits for simultaneously checking not only for continuity in the selected circuit but also for shorts or excessive leakage between same and any of the other external circuits coupled with the apparatus.

In the illustrated embodiment, the test position matrix (FIG. 1–P) is divided into 25 columns of horizontal index positions, each having a corresponding indicator lamp assembly I–18 to 42 (FIG. 1–E), and 16 rows of vertical index positions, each having a corresponding indicator lamp assembly I–1 to 16 (FIG. 1–E), defining 400 test positions, of which only 396 are used in the described embodiment. Five sets of receptacles (FIG. 2) are provided, each set permitting connection with the apparatus of up to 396 input and 396 output terminations of external circuits to be tested, or a total of up to 1980 input and 1980 output terminations for the five sets of receptacles. Obviously, more or less sets of receptacles adapted to accommodate more or less circuit terminations could be employed, if desired. For each set of said receptacles, there is provided a switching unit (designated as switching modules A, B, C, D and E in the illustrative embodiment utilizing five sets of receptacles for accommodating corresponding sub-groups of a multitude of external circuits to be tested), each of said switching modules including means for automatically scanning sequentially through the 396 matrix test positions, in the order in which same are numbered in FIG. 1–P, to permit the successive coupling with the circuit fault detector means (FIGS. 1–F and 1–G) of each of the up to 396 simple external circuits (or a number of multiple output termination circuits having up to 396 output terminations) connected with the corresponding set of receptacles. Physically interchangeable matrix charts of paper bearing appropriate information may be used for the identification of the particular circuits under test and the location of faults in connection with the testing of the five sets of external circuits respectively coupled with the switching modules A, B, C, D and E.

Such successive coupling with the circuit fault detector (FIGS. 1–F and 1–G) of external circuit terminations which are connected with the set of receptacles for any given circuit selecting unit or switching module A, B, C, D, or E is accomplished by a number of stepping switches ST.SW. Nos. 1 to 5 inclusive within the particular switching module, the fault detector being coupled back into the operating control means for such stepping switches in such manner that the automatic operation of the latter will be halted upon the detection of a fault in the external circuit under test. Since both the fault detector and the control means coupling by which the latter halts the operation of circuit selecting stepping switches are identical in principle and substantially the same in structure as those disclosed and described in detail in my said application Serial No. 472,487, and since such aspects, as such, of the apparatus are not deemed to involve or constitute any material part of the improvements contemplated by the present invention, a more detailed description of same herein should be unnecessary.

It may be noted in passing, however, that the successive scanning of matrix test positions in each of the modules A, B, C, D and E of the present apparatus is carried out by proceeding "vertically" down each of the vertical columns of matrix positions in turn, moving horizontally from column to column across the matrix (i.e. proceeding from position to position in the order in which same are numbered on the matrix in FIG. 1–P), whereas in the apparatus of my application Serial No. 472,487 matrix position scanning was carried out by proceeding "horizontally" across each of the horizontal rows of matrix positions in turn, moving downwardly from row to row of the matrix. Manifestly, absent consideration of the manner in which external circuits are to be coupled with test terminals corresponding with the various matrix positions, the terms "vertically" and "horizontally" are relative only and would have little significance. By the same token, the means for controlling scanning of the matrix by the above-mentioned stepping switches employed for such purpose can be, and are, essentially the same in the present apparatus as in that of my prior application Serial No. 472,487, but are applied to the matrix in a reversed orientation between "vertical" and "horizontal." Moreover, as long as one is concerned only with the testing of simple external circuits each having a single input termination and a single output termination only, which are respectively coupled with the program board input terminal and output terminal of a corresponding test matrix position, the difference between "vertical" and "horizontal" scanning becomes purely a matter of semantics.

However, if the apparatus is to be utilized in the testing of multiple circuits (i.e. circuits having a single input termination and two or more output terminations), and if the apparatus is adapted to have the input termination and one output termination of such a multiple circuit coupled with the program board input terminal and output terminal for a first matrix position, to have another output termination of such circuit coupled with the program board output terminal for a second matrix position whose input terminal is not coupled to the external circuit, and such second matrix position is removed from such first matrix position in a given direction or orientation (say "vertically," as is the case in the present apparatus and was also the case in the apparatus of my said prior application Serial No. 472,487), then the direction of matrix position scanning as "vertical," rather than "horizontal," obviously acquires mechanical significance as indicating scanning "in" the direction, rather than "across" the direction, of basic offset in the coupling of output terminations of multiple circuits (and the terms "vertical" or "vertically," as used herein in such connection, should be so understood). In other words, the apparatus of the present invention is adapted to test various output terminations of a given multiple circuit consecutively, without the use of the functions of the multiple circuit selector switches SW. A or SW. B for this purpose, while the apparatus of my prior application Serial No. 472,487 could test outputs of the same multiple circuit when coupled thereto in the same fashion as for the present apparatus only by the provision of and use of a multiple circuit selector switch as disclosed in said application. This feature of the present apparatus constitutes one advantageous improvement over my mentioned prior apparatus, which will be later seen to have particular significance in relation to other improvements hereinafter described by which the capacity and versatility of the apparatus for the testing of greater numbers of multiple circuits or the testing of such circuits having greater numbers of output terminations for a single input termination is markedly increased.

In logically continuing the general summary relative to the nature and operation of the present apparatus, another striking difference between same and the apparatuses of my said prior applications become apparent. Whereas my application Serial No. 472,487 taught the employment of only a single external circuit selecting unit or switching module whose test "outputs" were permanently connected with the fault detecting means, and my application Serial No. 558,056 taught the employment with the apparatus of my first-mentioned application of a plurality of coupling units, each adapted to have coupled therewith a number of external circuits equal to that which could be handled by the circuit selecting unit of said application Serial No. 472,487, in combination with relatively complex means for successively switching into coupling with such circuit selector unit the entire group of external circuit terminations connected with the various coupling units, the present apparatus provides a plurality of circuit selector units A, B, C, D and E, each having a group of external circuit terminations coupleable therewith, in combination with relatively simple means to be hereinafter more fully described for switching successively between such selector units with respect only to their test "outputs" and their scanning control operating leads, rather than with respect to the great numbers of external circuit terminations associated therewith. Manifestly, such feature involves another improvement effected by the present invention.

In view of the previously referred to quality of essential identity of principal and structural nature and relationships between many portions of the apparatus of my copending application Serial No. 472,487 and corresponding portions of the overall apparatus contemplated by the present invention, which portions per se constiute no material part of the present invention and therefore need not be repetitiously described in detail, the foregoing résumé of the general nature, purposes and mode of overall operation of the present apparatus should serve as a sufficient introduction for further, more detailed explanation of the specific improvements provided by the present invention.

As noted, one of the contemplated improvements involves the marked increasing of circuit handling capacity through the provision of a plurality of identical, external circuit selecting, switching modules A, B, C, D and E adapted to be selectively coupled to the electronic, current sensing, circuit fault detector shown in FIGS. 1–F and 1–G and to the control means for operating the intramodule, circuit selecting, stepping switches such as ST.SW.

A1 to 5 inclusive to apply test pulses to the coupled external circuits successively. Manifestly, this requires the provision of module selecting switching and control means not provided, needed or contemplated in connection with prior apparatuses of the same general class.

In this connection, observe first that each of the external circuit switching modules A, B, C, D and E is provided with a relay K26A, K26B, K26C, K26D or K26E respectively (FIG. 1–C), or a paralleled group thereof as at K26.1A, K26.2A and K26.3A (FIG. 1–C), whose contacts effectively isolate such module from the remaining modules and the rest of the apparatus until such relay is energized (except for constantly commoned connections such as provided for the shorting relay common lines 126 of all modules A, B, C, D and E at terminals *k* of their respective plug-socket connectors P10—S10 in FIG. 1–H). Reference to FIG. 1–C then demonstrates that selective energization of such relays K26A, K26B, etc. is controlled by bank No. 3 of a module selecting, stepping switch ST.SW. No. 6 (FIG. 1–C), which has ten successive step positions of which the first five are respectively coupled with relays K26A, K26B, etc. through terminals H, J, K, L and M respectively of socket-plug connector S22—P22 (FIG. 1–C).

Assuming that the main power switch SW. 17 (FIG. 1–A) is closed, the test selection switch 52 (FIG. 1–C) is on its position 1 corresponding to low voltage test, and bank No. 3 of module selecting, stepping switch ST.SW. No. 6 is in its position 1, as illustrated in FIG. 1–C, an energizing circuit for relay K26A (FIG. 1–C) can be traced from the negative 24 volt D.C. supply terminal F of socket-plug connector S18—P18 (FIG. 1–B) through terminal V of plug-socket connector P12—S12 (FIG. 1–B), conductor 109C (FIG. 1–B), conductor 109B (FIG. 1–C), bank 1A of test selection switch 52 (FIG. 1–C), terminal B of socket-plug connector S12—P12 (FIG. 1–C), terminal *c* of plug-socket connector P22—S22 (FIG. 1–C), then closed contacts K40–3 (FIG. 1–C), position 1 of bank No. 3 of module selecting stepping switch ST.SW. No. 6 (FIG. 1–C), terminal H of socket-plug connector S22—P22 (FIG. 1–C), terminal *t* of plug-socket connector P10A—S10A (FIG. 1–C), paralleled relays K26.1A, K26.2A and K26.3A (left side of FIG. 1–C), terminal *n* of plug-socket connector P10A—S10 (FIG. 1–C), terminal C of plug-socket connector P13—S13 (FIG. 1–B), fuse F5 (FIG. 1–B) and terminal P of socket-plug connector S12—P12 (FIG. 1–B) to the positive 24 volt D.C. supply terminal E of plug-socket connector P18—S18 (FIG. 1–B).

Module selecting stepper switch ST.SW. 6 is operated by a coil so designated in FIG. 1–C. The normal function of stepping switch ST.SW. 6 is to initially advance itself to its No. 1 position for energizing relay K26A to activate switch module A each time the power is turned on in the apparatus to commence a series of testing operations, then to subsequently advance itself to its own successive positions for energizing the other K26 relays to activate switch modules B, C, D and E as the testing progresses. The stepping switch ST.SW. 6 is provided with normally closed circuit interrupter contacts CI to open whenever the actuating coil ST.SW. 6 is energized, it being understood that stepping switch ST.SW. 6 is of the type which advances or steps upon deenergization of its operating coil after a previous energization thereof. The circuit interrupter contacts CI thus can be and are utilized for the purpose of providing an automatic advancing circuit for the stepping switch ST.SW. 6 which will function automatically once energized until a positioning control switch coupled therein interrupts the circuit.

Such automatic advancing circuit for the stepping switch ST.SW. 6, it as exists upon initially applying power to the apparatus and regardless of the positional condition of stepping switch ST.SW. 6 at the time, may be traced from the negative 24 volt D.C. terminal F of socket plug connector S18—P18 (FIG. 1–B) along the same path as previously traced for the energizing circuit for relay K26A so far as terminal *c* of plug socket connector P22—S22 (FIG. 1–C), thence through the normally closed side of contacts K27–1 (FIG. 1–C) of relay K27 (FIG. 1–C), through the normally closed circuit interrupter contacts C1 of stepping switch ST.SW. 6 (FIG. 1–C) to the operating coil ST.SW. 6 (FIG. 1–C) and from the opposite side of the latter to the common positive relay voltage circuit traceable through terminal *y* of socket plug connector S22—P22 (FIG. 1–C) and terminal C of plug socket connector P13—S13 (FIG. 1–B), fuse F5 and terminal P of socket plug connector S12—P12 (FIG. 1–B) to the positive 24 volt D.C. terminal E of plug socket connector P18—S18 (FIG. 1–B). Upon energization of the operating coil of stepping switch ST.SW. 6, the advancing mechanism for said stepping switch will be cocked and the associated circuit interrupter contacts CI will be opened. Opening of such circuit interrupter contacts CI releases the armature of stepping switch ST.SW. 6 and causes the same to advance one position. Manifestly, upon such release and advancement of the operating parts of stepping switch ST.SW. 6 responsive to deenergization of the operating coil thereof, the circuit interrupter contacts CI associated with stepping switch ST.SW. 6 will again be closed to reenergize the operating coil ST.SW. 6 through the circuit just above traced, so that the stepping cycle of stepping switch ST.SW. 6 will be automatically repeated until such switch has advanced to its sixth position. At such time, bank BK No. 2 of stepping switch ST.SW. 6 (FIG. 1–C) completes an energizing circuit for the operating coil of relay K27 (FIG. 1–C) which is traceable as for the above traced circuits from the negative 24 volt D.C. terminal F of socket plug connector S18—P18 (FIG. 1–B) through terminal V of plug socket connector P12—S12 (FIG. 1–B) and position No. 1 of Bank No. 1A of test selection switch SW. 52, thence through terminal C of socket plug connector S12—P12 (FIG. 1–C), terminal *k* of plug socket connector P22—S22 (FIG. 1–C), contacts 6 et seq. of bank No. 2 of stepping switch ST.SW. 6 (FIG. 1–C) to the negative energized side of relay coil K27 (FIG. 1–C) and from the other side of the latter to the common positive relay voltage circuit traced above.

Energization of relay coil K27 closes contacts K27–2 thereof (FIG. 1–C), which are paralleled with bank No. 2 of stepping switch ST.SW. 6 and completes a holding circuit for retaining the relay K27 energized, as will be apparent to those skilled in the art. Energization of relay K27, it may be noted, also opens the contacts 2 and 3 of switch K27–1 (FIG. 1–C) associated therewith, and disposed in the previously traced energizing circuit for stepping switch ST.SW. 6. At the same time, however, energization of relay K27 closes contacts 1 and 2 of its associated switch K27–1 to complete a new energizing circuit for stepping switch ST.SW. 6 which is traceable, as above, to terminal *c* of plug socket connector P22—S22 (FIG. 1–C), thence through contacts 6 et seq. of bank No. 1 of stepping switch ST.SW. 6 (FIG. 1–C) one of which will be closed as the stepping switch ST.SW. 6 advances through its position 6 et seq., thence through contacts 1 and 2 of relay switch K27–1 to the circuit interrupter contacts CI of stepping switch ST.SW. 6 and to the operating coil ST.SW 6 thereof, as above traced.

The stepping switch ST.SW. 6 will thus continue to advance by virtue of the operation of the above traced recycling circuits therefor until it has reached its position No. 1, whereupon the last traced recycling circuit through bank No. 1 of stepping switch ST.SW. 6 will be broken and the first traced recycling circuit will also be opened by virtue of the fact that the holding circuit for relay K27 continues to maintain the same energized to hold the contacts 2 and 3 of relay switch K27–1 apart.

With stepping switch ST.SW. 6 thus indexed to its No. 1 position, the K26 relay will be energized to activate switching module A, whose stepping switches SW. 2–1 to 5 inclusive will be cycled to their No. 1 positions in essentially the same maner as disclosed for the stepping switches in the apparatus of my said prior application Serial No. 472,487.

By way of further improvement, this invention also contemplates the provision of both manual and automatic means for controlling the positioning or advancement of the module selecting stepper switch ST.SW. 6. Considering first the manual module selection means, there is provided and shown in FIG. 1–C a plurality of push button type modular index switches SW. 43 to 47 inclusive whose shiftable pole pieces 5 are normally in engagement with contacts 6 but adapted to be shifted upon manipulation into electrical circuit completing engagement with the corresponding contact 4. The contacts 4 of modular index switches 43 to 47 inclusive are coupled with position No. 1 of bank No. 1A of test selection switch SW. 52 which, as above noted, is in turn connected with the minus 24 volt D.C. supply terminal. The manipulation of any one of the switches 43–47 inclusive to bring its pole piece 5 into connection with its negatively energized contact 4 will energize all of the contacts 1 through 5 inclusive of bank No. 1 of stepping switch ST.SW. 6, except the one corresponding to that one of switches SW. 43 to 47 inclusive which has been manipulated, to be energized with a negative voltage derived from the manipulated one of switches 43 et seq. from its contact 4 and passed through the socket plug connectors S13—P13 and P22—S22 (FIG. 1–C) to the corresponding contacts of bank No. 1 of stepping switch ST.SW. 6. It will be further noted that contacts 6 et seq. of bank No. 1 of stepping switch 6 are continuously energized with a negative voltage derived from the connection of same with terminal *c* of socket plug connector S22—P22. Assuming that the initial cycling of the stepping switch ST.SW. 6 to its position No. 1 has been completed upon initial energization of the apparatus, the relay K27 will remain energized and the contacts 1 and 2 of its switch K27–1 will be closed. This presents a recycling circuit for the stepping switch ST.SW. 6 traceable from each of the contacts of bank No. 1 of stepping switch ST.SW. 6 except the one corresponding to one of the modular index switches SW. 43 to 47 inclusive which has been operated, such circuit being traceable from the negatively energized contacts of bank No. 1 of stepping switch ST.SW. 6 through closed contacts 1 and 2 of relay switch K27–1, the circuit interrupter switch CI of stepping switch ST.SW. 6 to the operating coil ST.SW. 6. Accordingly, regardless of the position occupied by stepping switch ST.SW. 6 when one of the modular index switches 43 to 47 inclusive is manipulated, such stepping switch ST.SW. 6 will be advanced from position-to-position until its bank No. 1 switch reaches a contact thereof which is not negatively energized, whereupon the advancing circuit will be broken and the stepping switch ST.SW. 6 will come to rest.

Since the deenergized contact of bank No. 1 of stepping switch ST.SW. 6 corresponds to the selected one of the modular index switches SW. 43 to 47 inclusive, it will be clear that the latter permit manual switching from any of the modules A, B, C, D and E to any other of the same at any time. It may be noted that bank No. 4 of stepping switch ST.SW. 6 (FIG. 1–E) is operable to at all times energize that one of indicating lamp assemblies I–43 to I–47 inclusive (FIG. 1–E) which corresponds to the one of modules A, B, C, D or E that is then activated.

The next facet of the selectable, plural module improvement involves the provision of means permitting the apparatus to be so set that the stepping switch ST.SW. 6 will automatically switch from the activation of one of the modules A, B, C, D or E to the next when a certain preselected point in the testing sequence associated with the first mentioned module has been reached. For this purpose, a special pin is provided in the 397th position of bank No. 4 of stepping switch ST.SW. 2 of each of the switch modules A, B, C and D, which is indicated by a star thereabove in FIG. 1–N and is coupled by a conductor 133N through relay contacts 21 and 22 of the corresponding relay K26 (FIG. 1–L), thence through terminal D of socket plug connector S10—P10 (FIG. 1–L), terminal G of plug socket connector P12—S12 (FIG. 1–L), position No. 1 of bank No. 5A of test selection switch SW. 52 (FIG. 1–L), terminal *f* of socket plug connector S12—P12 (FIG. 1–L), terminal P of plug socket connector P21—S21 (FIG. 1–L) to one side of the operating coil of relay K42 (FIG. 1–L) whose opposite side is connected to the negative 28 volt direct current supply through terminal *a* of socket S20 (FIG. 1–B), terminal *h* of socket plug connector S21—P21 (FIG. 1–D) and terminal F of plug socket connector P19—S19 (FIG. 1–B). Any one of the output terminals 1 through 396 inclusive of the program board for the corresponding switching module A (or B, C, D or E) may then be connected by a suitable jumpered wire to such special pin on bank No. 4 of stepping switch ST.SW. 2 which is identified by a star in FIG. 1–N. When the intra-module stepping switches 1 to 5 inclusive of the module having such jumpered connection with the special, starred pin reach that test position whose output terminal is jumpered to the mentioned special pin, the positive test pulse voltage which would normally be applied to an external circuit to be tested is instead applied through the mentioned special pin and above traced circuit to the operating coil of relay 42 (FIG. 1–L) for energizing the latter. It may be noted in FIG. 1–L that position No. 3 of bank No. 5A of test selection switch SW. 52, which corresponds to a high voltage test in which a high voltage test pulse is normally applied to external circuits, is provided with a reducing resistance R152 coupled between its position No. 3 contact and terminal B of plug socket connector P21—S21 (FIG. 1–L) in order to provide a proper operating voltage for the coil of relay K42. Next referring back to FIG. 1–C, it will be seen that the relay K42 has associated therewith two sets of normally open switches K42–1 and K42–2 which are adapted to close upon the energization of the coil of relay 42 in the manner just described when a module under test reaches that preselected position thereof whose output terminal has been jumpered to the aforesaid special pin of bank No. 4 of stepping switch ST.SW. 2. Remembering that the relay switch K27–2 (FIG. 1–D) is being held closed by its relay coil K27, it will be seen that the closing of relay switch K42–1 completes an energizing circuit for stepping switch ST.SW. 6 traceable from terminal *h* of plug socket connector P22—S22 (FIG. 1–C) through closed relay switch K27–2 and now closed relay switch K42–1 to the stepping switch operating coil ST.SW. 6. At the same time, the closing of relay switch K42–2 (FIG. 1–C) closes an energizing circuit for relay coil K40 (FIG. 1–C) traceable from terminal *c* of socket plug connector S22—T22 through now closed relay switch K42–2 to the operating coil K40, which is oppositely connected with the previously mentioned common positive relay voltage circuit. Energization of relay K40 opens its associated relay switch K40–3 (FIG. 1–C) through which the energizing circuit for the module activating relay K26 corresponding to the particular one of modules A, B, C, D or E which is operating has been traced. This deenergizes such relay K26, for instance, K26–A, which in turn breaks the energizing circuit for the relay coil K42 (FIG. 1–M) by opening the relay contacts 21 and 22 of the K26 switch interposed in FIG. 1–M between the conductor 133N and the terminal D of the socket plug connector S10—P10. The deenergization of relay K42 in such manner opens its associated switch K42–1 (FIG. 1–C) to deenergize the coil of module selecting stepping switch ST.SW. 6 (FIG. 1–C), permitting the latter to advance to its next position, thereby energizing the activating relay K26 of the module A, B, C, D or E next in order, it being noted that the relay switch K40–3 (FIG. 1–C) has been reclosed to permit energization of the next relay K26 by the deenergization of relay K40 (FIG. 1–C) upon the opening of relay switch K42–2 (FIG. 1–C) when the relay coil K42 (FIG. 1–M) was deenergized.

Since the special starred pin of bank No. 4 of stepping switch ST.SW. 2 in each of the modules A, B, C, D and E may be independently jumpered to a different output terminal of the program board of such module, it will be clear that each of said modules can be adapted for automatically actuating the module selecting stepping switch ST.SW. 6 to activate the next module at independently selected points in the test sequence of the module in which such automatic advancing connection is made.

The next improvement incorporated in the apparatus of the present invention relates to the manner of handling for testing multiple circuits (i.e. circuits having a single input termination and two or more other terminations which are treated for purposes of testing as being output terminations) and also has several facets thereto. As has already been described in a general way, the use in the present apparatus of "vertical scanning" (i.e. scanning in the same direction along the test matrix as that of the offset in connection of the output terminations of multiple circuits to the apparatus), is, of itself, advantageous in that it permits an operator to test completely through the various terminations of a multiple circuit in consecutive order with resultant improvement in control of the testing procedure and evaluation of the results thereof, particularly with respect to any faults in the circuit detected by the apparatus. It will be understood that this advantageous feature is achieved independently of the multiple circuit selector switches SW. 2 and SW. B (i.e. with such switches in their No. 1 or single circuit positions). The functioning of the apparatus in this respect may be more specifically described by considering a multiple circuit whose input termination is connected with the input terminal 1 on the program board front in FIG. 1–I. Note that whenever the switching module A, B, C, D or E under consideration is activated, such input terminal 1 of its program board will be coupled through its stepping switch No. 2 bank No. 8 (FIG. 1–I) when the latter is in its No. 1 position, with the conductor 121G (FIG. 1–I) and the conductor 121I (FIG. 1–G), through the contacts 1 and 2 of the corresponding relay switch K26, thence through terminal A of socket plug connector S10—P10 (FIG. 1–G), terminal *u* of plug socket connector P13—S13 (FIG. 1–G), and position No. 1 of bank No. 1A of meter selection switch SW. 51 to the input terminal *b* of plug 11 corresponding to continuity input 1 of the detector unit in FIG. 1–G. Since, with "vertical scanning," bank No. 8 of stepping switch No. 2 (FIG. 1–I) will remain indexed to its position No. 1 during the advancement of bank No. 2 of the vertical stepping switch No. 4 (FIGS. 1–L and 1–N) through its successive positions corresponding to the output terminals 1–16 inclusive of the program board (FIGS. 1–L and 1–N). Accordingly, a multiple circuit having an input connected with input terminal 1 of the program board in FIG. 1–I and up to 16 output terminations respectively coupled to output terminals 1 through 16 inclusive of the program board (output terminal 1 being in FIG. 1–I, output terminals 2–7 inclusive being in FIG. 1–L, and output terminals 8–16 inclusive being in FIG. 1–N) may be consecutively tested during vertical scanning of a single column of matrix test positions corresponding to those numbered 1 through 16 inclusive in the test position matrix chart illustrated in FIG. 1–P, as test pulses are applied successively to such output terminals during the stepping of bank No. 2 of vertical stepping switch No. 4 (FIGS 1–L and 1–N).

A second feature of the improvement in the handling of multiple circuit testing in the present apparatus is achieved by providing in the fault detector unit of FIGS. 1–F and 1–G a third current sensitive fault detecting channel identical to the others, which may be constructed in the manner more fully described in my said co-pending application Serial No. 472,487, which third input of the detector unit is coupled from terminal *e* of plug 11 thereof (FIG. 1–G) through position No. 1 of bank No. 2A of meter selection switch 51 (FIG. 1–G), terminal *c* of socket plug connector S13—P13 (FIG. 1–G), terminal C of plug socket connector P10—S10 (FIG. 1–G), contacts 5 and 6 of the corresponding module activating relay K26 (FIG. 1–G) and conductor 124 (FIGS. 1–G, 1–H, 1–K, 1–L and 1–N), thence through appropriate contacts of bank No. 3 of module stepping switch No. 5 (FIG. 1–N), bank No. 3 of module stepping switch No. 3 (FIG. 1–N) to input terminal No. 9 on the program board front in FIG. 1–N. Such circuit effects a connection of the mentioned input terminal 9 with the input of channel 3 of the detector unit which is made whenever the module has vertically stepped down to its 9th position or level of matrix scanning and which is maintained during the continued scanning of the matrix through vertical levels 9 through 16 thereof. Thus, such input terminal 9 is adapted for handling the input termination of an additional multiple circuit which may have its output termintaions coupled with various of the output terminals 9 through 16 inclusive of the program board front of which the pertinent portion is shown in FIG. 1–N. Accordingly, during vertical scanning of a single matrix test position column, separate multiple circuits can be tested by having their input terminations coupled with program board input terminals 1 and 9 respectively. This permits the apparatus to handle a greatly increased number of multiple circuits each having a relatively small number of output terminations without wasting capacity of the apparatus by needless employment of the multiple circuit selection switches SW. A and SW. B.

The multiple circuit selection switches SW. A and SW. B of each of the modules A, B, C, D and E each operate per se in fashion substantially identical to that described in my said co-pending application Serial No. 472,487 and are individually effective to permit the commoning of various combinations of input terminals of the program board so that output terminations of an external circuit may be coupled with output terminals located in more than one vertical column of test matrix positions, even though their common input is coupled with an input terminal corresponding to only one of such columns. An improvement incorporated in the present apparatus, however, is found in the provision of the horizontal multiple circuit extension switch A2 shown in FIG. 1–J. When such switch is in its normal position with its contacts 2 and 3 engaged, the multiple circuit selector switches SW. A and SW. B operate independently. With the horizontal extension switch A2 shifted to its add position in which its contact 2 is engaged with its contact 1, however, the multiple circuit switches SW. A and SW. B are effectively ganged electrically so that the last multiple circuit pattern selected by the switch SW. A is added to the first multiple circuit pattern selected on switch B. It may be observed that with such multiple circuit selector switches SW. A and SW. B both in their fifth positions, the input terminals 1 through 13 inclusive of the program board (FIGS. 1–I and 1–J) would all be commoned, so that a single input termination of an external circuit coupled with one of same could be tested against a total of 209 output terminations coupled to output terminals 1 through 209 inclusive of the program board.

Still another facet of the improvement in the handling of multiple circuits in the present apparatus is found in the means provided for the testing of a multiple circuit having its input termination coupled with one of the modules A, B, C, D or E and certain of its output terminations coupled with one or more of the other of such modules. Such result has been accomplished by the provision of means for commoning the input terminals No. 1 of two or more of the modules A, B, C, D and E (or, as shown in the illustrated embodiment, for also commoning various other input terminals of a plurality of modules, input terminals Nos. 1, 4 and 6 having been chosen for illustration). The multiple circuit vertical extension switches SW. C of each module are provided for this purpose. Such switches are effective to interconnect the first multiple circuit test patterns of each of the affected modules to the corresponding pattern of all other affected modules, thereby providing a return path for the multiple circuit input of module A, for instance, to the particular other module in which the output termination of the test circuit under consideration is connected. To illustrate, assume that the multiple circuit selector switches SW. A of modules A and B are in their No. 2 position and the vertical extension switches SW. C of such modules A and B are in their No. 2 positions. The continuity path of an external circuit portion having its output termination coupled with output terminal 33 of module B and its input termination coupled with terminal 1 of module A can be traced from the latter along a conductor leading to contact 2 of multiple selector switch SW. A of module A (FIG. 1–I), thence through extension switch SW. C–1A of module A in its second position to terminal *q* of socket plug connector S10—P10 of module A, thence through the commoning thereof as shown in FIG. 1–O, out of terminal *q* of plug socket connector P10—S10 of module B, thence through extension switch SW. C–1A of module B in its position No. 2 and multiple circuit selector switch SW. A–1A of module 2 in its second position through multiple circuit switch SW. A–2A of module B in its second position, thence through the then closed contacts 1 and 2 of the K26 relay for module B and through terminal A of socket plug connector S10—P10, terminal *u* of plug socket connector P13—S13 and position No. 1 of bank No. 1A of meter selection switch SW. 51 to the first continuity input terminal *b* of plug P11 on the detector unit.

Obviously, by such last described means, the apparatus of this invention is adapted to handle the testing of multiple circuits having a single input termination and a great number of output terminations such that same could not be conveniently handled by any one of the modules A, B, C, D or E alone.

Before proceeding to a consideration of the next specific improvement incorporated in the present apparatus, it may be helpful to summarize certain aspects of the operation of the apparatus with regard to the control of the intra-module stepping switches ST.SW. 1 to 5 inclusive of an activated module A, B, C, D or E and the effect thereupon of fault and no fault signals from the detector unit of FIGS. 1–F and 1–G.

Accordingly, assume that the power has been supplied to the apparatus and that the module selector stepping switch ST.SW. 6 has indexed to its No. 1 position energizing the activating relay K26A for the module A, energization of such relay K26A (FIG. 1–C) will close contacts 11 and 12, 13 and 14, 15 and 16, 17 and 18, 23 and 24, 25 and 26, 27 and 28, 29 and 30 of the relay switches designated K26.2 in FIG. 1–D to complete energizing circuits for the module A stepping switches ST.SW. 1, 2, 4 and 5, such circuit being traceable for stepping switches ST.SW. 1 of module A from terminal *h* of plug socket connector P22—S22 (FIG. 1–C), which is negatively energized as above noted, to conductor 113 (FIGS. 1–C and 1–D), through terminal *p* of socket plug connector S22—P22 (FIG. 1–D), terminal R of plug socket connector P10—S10 (FIG. 1–D), circuit interrupter switch CI for stepping switch ST.SW. 1 (FIG. 1–D), contacts 24 and 23 of relay switch K26.2, terminal Q of socket plug connector S10—P10, terminal *m* of plug socket connector P22—S22, then closed contacts 7 and 8 of relay switch K28.3 (FIG. 1–D), terminals *n* of socket plug connector S22—P22, terminal *e* of plug socket connector P10—S10, contacts 11 and 12 of relay switch K26.2, and still closed off normal switch ON of stepping switch ST.SW. 1 (FIG. 1–D) to the operating coil of stepping switch ST.SW. 1 of module A, whose opposite side is coupled through relay switch K37.1 (FIG. 1–D) with the common positive relay voltage circuit. Such stepping switches ST.SW. 1, 2, 4 and 5 of module A are then cycled by their respective circuit interrupter switches CI in the same manner as above described for the module selector stepping switch ST.SW. 6 until they reach their off normal or 26th position, whereupon their off normal contacts ON are shifted to discontinue cycling energization of such stepping switches and to complete a circuit from contact 14 of relay switch K26.2 through contacts 2 and 3 of off normal switch ON associated with stepping switch ST.SW. 2 for energizing relay K36 (FIG. 1–C) through a circuit traceable from contact 3 of off normal switch ON of stepping switch ST.SW. 2 through position 26 of bank No. 2 of stepping switch ST.SW. 4 (FIG. 1–D), closed contacts 11 and 12 of relay K26.1, terminal *j* of plug socket connector P10—S10, terminal W of socket plug connector S22—P22 (FIG. 1–D), conductor 111 (FIGS. 1–D and 1–C) to the side of the operating coil for relay K36 (FIG. 1–C) opposite to the common positive relay voltage circuit. Energization of relay K36 (FIG. 1–C) closes its associated switch K36.2 (FIG. 1–D) by which stepping switch ST.SW. 3 of module A may be cyclically energized when the stepping switch ST.SW. 5 has reached its off normal position shifting its associated off normal switch ON. Such circuit is traceable from contact *p* of plug socket connector P22—S22 (FIG. 1–D), which is negatively energized as above noted, through terminal *v* of plug socket connector P22—S22 (FIG. 1–D), terminal P of plug socket connector S10—P10, now closed circuit interrupter switch CI of stepping switch ST.SW. 5 (FIG. 1–D), closed contacts 29 and 30 of relay switch K26.2, terminal *t* of socket plug connector S10—P10, terminal *f* of plug socket connector P22—S22, then closed contacts 2 and 3 of relay switch K29.1 (FIG. 1–D), terminal *a* of socket plug connector S22—P22, terminal *b* of plug socket connector P10—S10, closed contacts 17 and 18 of relay switch K26.2, now closed contacts 2 and 3 of the off normal switch ON of stepping switch ST.SW. 5, closed contacts 19 and 20 of relay switch K26.2, terminal Z of plug socket connector P10—S10, terminal G of plug socket connector P21—S21, now closed contacts 4 and 5 of relay switch K36.2, terminal *f* of socket plug connector S21—P21, terminal U of plug socket connector P10—S10, still closed contacts 2 and 1 of off normal switch ON associated with stepping switch ST.SW. 3, closed contacts 21 and 22 of relay switch K26.2 and then circuit interrupter contact CI of stepping switch ST.SW. 3 to the side of stepping switch ST.SW. 3 opposite the common positive relay voltage connector through relay switch K37–1.

As will be apparent, the circuit interrupter switch CI of stepping switch ST.SW. 3 will cycle the latter until it has advanced to its 26th or off normal position. When it does reach such off normal position the contact 2 of its off normal switch is transferred into engagement with the contact 3 thereof (FIG. 1–D) thereby energizing the relays K28 and K29 (FIG. 1–C) through a circuit traceable from contact 3 of the off normal switch ON of stepping switch ST.SW. 3 through the off normal position of bank No. 2 of stepping switch ST.SW. 1 (FIG. 1–D), closed contacts 14 and 13 of relay switch K26.1, terminal W of socket plug connector P10—S10, terminal *g* of plug socket connector P22—S22, conductor 112 (FIGS. 1–D and 1–C), then closed relay switch K40–1 (FIG. 1–C) to the side of relays K28 and K29 opposite the common positive relay voltage circuit. The energization of relays K28 and K29 transfers contact 2 of relay switch K29–1 into engagement with contact 1 thereof (FIG. 1–D) thereby completing an energizing circuit through such contacts from energized terminal *f* of plug socket connector P22—S22 to the side of relay K34 (FIG. 1–D) opposite the common positive voltage circuit. Energization of relay K34 (FIG. 1–D) closes its relay switch K34–4 in FIG. 1–C to complete an energizing circuit for the relay K39 (FIG. 1–C) traceable from the negatively energized terminal *h* of plug socket connector P22—S22 (FIG. 1–C) through the closed relay switch K28–2, closed relay switch K34–4, terminal *d* of socket plug connector S21—P21, terminal L of plug socket connector P10—S10, closed contacts 7 and 8 of relay switch K26.1, the 26th or off normal position of bank 1 of stepping switch ST.SW. 4 (FIG. 1–C), terminal *v* of socket plug connector S10—P10, and terminal *b* of plug socket connector P22—S22 to the side of relay K39 (FIG. 1–C) opposite the common positive relay voltage circuit.

Energization of relay K39 opens its associated switch K39–1 (FIG. 1–C), which deenergizes the relay K32 (FIG. 1–C), which has been in a condition of normal energization during this portion of the cycle. Deenergization of relay K32 closes its associated switch K32–1 (FIG. 1–C) thereby completing an energizing circuit for relays K30 and K31 (FIG. 1–C) traceable from negatively energized terminal *d* of socket plug connector S21—P21 (FIG. 1–C). Energization of relays K30 and K31 (FIG. 1–C) completes energizing circuits for stepping switches ST.SW. 1 through 5 inclusive, thereby providing for the advancement of same to their respective No. 1 test positions, one of these circuits for stepping switch ST.SW. 1, for example, being traceable from negatively energized conductor 113 (FIGS. 1–C and 1–D), through the closed relay switch K39–2 (FIG. 1–D), then closed contacts 2 and 1 of relay switch K31–1 (FIG. 1–D), terminal *q* of socket plug connector S22—P22, terminal *d* of plug socket connector P10—S10, closed relay contacts 1 and 2 of relay switch K26.2 to the side of stepping switch ST.SW. 1 opposite the common positive relay voltage circuit.

The apparatus is then ready to start its cycle of progressive testing through the positions of the test matrix. A test pulse is applied to the external circuit coupled with the No. 1 input and output terminals of the program board (FIG. 1–I) from the positive side of the power supply through the bank 2A of test selection switch SW. 52 (FIG. 1–G), closed contacts 6 and 7 of relay switch K34–3 (FIG. 1–G), closed contacts 6 and 7 of relay switch K36–3 (FIG. 1–G), bank 3B of meter selection switch SW. 51 (FIG. 1–G), bank 6A of test selection switch SW. 52 (FIG. 1–G), then closed contacts 17 and 18 of relay K26.1 (FIG. 1–G), conductors 119 (FIGS. 1–G and 1–L), OP switch associated with bank 2 of stepping switch ST.SW. 4 (FIG. 1–L), conductor 129 (FIGS. 1–L, 1–K, 1–J and 1–I), stepping switch ST.SW. 1 of bank No. 5 in its first position to output terminal 1 (FIG. 1–I). Such tested pulse, presuming continuity in the external circuit under test, will pass through the latter to the input terminal No. 1 on the program board in FIG. 1–I, thence through position 1 of stepping switch No. 2, bank No. 8 (FIG. 1–I), conductor 121 (FIGS. 1–I and 1–G), closed contacts 1 and 2 of relay switch K26.1 (FIG. 1–G) and bank 1A of meter selection switch SW. 51 to the first input terminal *b* of plug P11 on the detector unit. Referring to FIG. 1–F, it will be apparent to those skilled in the art that such pulse passing through the external circuit under test is applied through a bias resistor coupled with the negative side of the power supply to the grid numbered 2 of the vacuum tube detector V–1. Such bias resistor and the resistance of the external circuit under test form a voltage divider which determines the level of the voltage applied to the grid 2 of the detector tube. If such voltage applied to the grid is of sufficient positive level with respect to the cathode voltage, which is preset by the potentiometer R79 (FIG. 1–F), which setting corresponds to a predetermined amount of resistance which will be considered acceptable in the external circuit under test, the tube will conduct, resulting ultimately in the deenergization of the open circuit air relay K43 (FIG. 1–F). Upon deenergization of the open circuit air relay K43, the switch K43–1 (FIG. 1–C) is closed to reenergize relay K32 (FIG. 1–C) to permit further stepping to the next circuit testing position. On the other hand, if the voltage applied to the grid of the detector tube from he pulse passing through the external circuit is of insufficient level to cause conduction of the tube, the open air relay K43 (FIG. 1–F) will remain energized, which prevents advancement of the intra-module stepping switches to the next test position and incidentally energizes the open air indicating lamp assembly I–49 (FIG. 1–E) through the relay switch K43–2 (FIG. 1–E).

If a short circuit or undue leakage exists between the circuit under test and any of the circuits connected with the analyzer, an air signal will be fed to the short input terminal V of plug 11 of the fault detector unit (FIGS. 1–F and 1–G), through the shorting relay contacts K–1 through K–25 inclusive (FIGS. 1–I, 1–J, 1–K and 1–L) coupled with the inputs of the other external circuits connected with the apparatus, and conductors 130, 127 and 126 to inter-module common terminal *k* of plug socket connectors S10—P10 (FIG. 1–H) and conductor 123 through bank 2–B of meter selection switch 51 (FIG. 1–G) to the short input terminal V of plug P11. Such short indicating signal is applied to the grid numbered 2 of the short detector tube V–3 (FIG. 1–F) through a biasing resistor coupled to the negative side of the power supply in fashion similar to that above described for the continuity detector tube. In the presence of a signal indicating an inter-circuit short or unduly high leakage therebetween, the grid of the short detector tube will be driven positive with respect to the cathode thereof, causing conduction of such tube D–3 and resulting in the deenergization of short air inducting relay K44 (FIG. 1–F). Denergization of relay K44 closes its associated switch K44–2 (FIG. 1–C) to the normal position thereof energizing relay K–32 (FIG. 1–C) and preventing stepping of the apparatus to the next test position. If no such short indicating signal is presented to the short input of the detector unit, the tube V–3 will not conduct, short air indicating relay K44 (FIG. 1–F) will remain energized, and the intra-module stepping switches may operate to step the apparatus to the next testing position in the matrix.

Accordingly, it will be understood that if no short or continuity errors are found on the first test position (i.e. testing an external circuit coupled between the input and output terminals No. 1 on he program board), the relay K32 will be deenergized, resulting in the energization of relays K30 and K31, which, in turn, energizes the intra-module stepping switches ST.SW 4 and 5, whose circuit interrupter contacts CI interrupt the circuit to the relay K34, thereby deenergizing the latter to, in turn, deenergize the relays K30 and K31, which allows stepping switches ST.SW 4 and 5 to advance to test position No. 2. Such procedure continues, in the absence of the detection of any external circuit error, until test position No. 16 at the end of the first column of vertical scanning has been reached. Presuming that no circuit error is detected at test position No. 16, the relay K32 will again be deenergized, in turn energizing relays K30 and K31, which results in the advancement of the stepping switches ST.SW. 4 and 5 to their 26th or off normal position. As the stepping switches ST.SW 4 and 5 reach their off normal position, and off normal contacts O.N. are shifted to energize relay K30, which in turn energizes all of the operating coils for the stepping switches ST.SW 1 through 5 inclusive, the circuit interrupter contacts of the latter then denergize the relays K33 and K44, which in turn deenergizes the relays K30 and K31, which results in all of the stepping switches ST.SW 1 through 5 inclusive advancing one position so that the apparatus will be indexed for the testing of an external circuit at matrix position No. 17.

The above sequence of operations is repeated until the intra-module stepping switches have advanced to the 397th position relative to the testing matrix, which is on position beyond the last external circuit which can be tested, whereupon, a circuit is completed for the energization of relays K42, and then its slave relay K40. Energization of relay K40 deenergizes relays K28 and K29, which advances the module selecting stepping switch ST.SW. 6 one position to activate the next of the modules A, B, C, D or E, the noted intra-module sequence is then repeated. It may be noted in passing that the error reset switch SW. 48 shown in FIG. 1–C provides for the manually controlled energization of relays K30 and K31 to reinitiate a stepping cycle after a circuit error has interrupted the same, it being understood that appropriate notations concerning the nature and location of the error will normally be made by the operator before he manipulates switch SW. 48.

The next specific improvement involved in the apparatus of the present invention may now be more clearly explained. During the moment of time which elapses while the intra-module stepping switches are shifting from one position to the next, the equivalent of an open circuit test condition will be applied to the continuity detector inputs of the detector unit. This is advantageous because it conditions the detector unit to an error condition immediately before a new external circuit to be tested is coupled therewith. Accordingly, the detector unit will insist upon a positive indication of continuity in the external circuit brought into testing relationship before it will actuate the control functions necessary for stepping on to a successive circuit.

On the other hand, the open circuit condition which exists while shifting between test positions presents to the short testing input of the detector unit immediately before a new circuit is brought into testing relationship a signal that is equivalent to a satisfactory test or no short condition. This has been found undesirable because, with the short detector thus preset to an acceptance or no error condition as a new circuit is moved into testing relationship, it is possible that the continuity detector might be actuated by a low resistance circuit to step the apparatus on to the next testing position before a valid test could be completed for a short or excessive leakage, this would obviously result in an error of the latter nature remaining undiscovered.

In order to eliminate the above difficulty a special circuit has been provided in this apparatus which is traceable in FIG. 1–G from the low voltage input position No. 1 of bank No. 2A of test selection switch SW. 52 through terminal A of socket plug connector S13—P13, terminal T of plug socket connector P22—S22, terminals 7 and 6 of test pulse relay switch K34–3, terminals 7 and 8 of test pulse slave relay switch K36–3, terminal N of socket plug connector S22—P22, terminal *d* of plug socket connector P13—S13 and position No. 1 of bank No. 2B of meter selection switch SW. 51 to the short input terminal V of plug P11 on the detector unit. In understanding the operation of this circuit, it is first noted that the test pulse relay K34 is the first relay to operate when a new test position has been reached. Slave relay K36 does not actuate until relay K36 has fully transferred its contacts. Accordingly, during the momentary time interval between the operation of relay K36 and the operation of relay K34 the above traced circuit delivers a positive voltage to the short detector input, which is the equivalent of a fault or circuit error indicating signal. Upon a new external circuit being switched into testing relationship, the short detector input is immediately suppled with an artificial fault indicating signal which initially conditions such detector to a fault situation, as desired. Upon operation of the relay K36, the above-mentioned circuit is broken at switch K36–3, whereupon if the actual circuit under test is not susceptible to a short error, the short detector will return to a no error condition and permit advancement of the apparatus to the next testing position.

It will now be apparent that the present invention provides many improvements over the apparatuses disclosed in my aforesaid prior, co-pending applications and that the invention fulfills all of the above-mentioned and other objects thereof. It will be understood, however, that a number of changes from the exact circuitry and arrangements disclosed hereinabove for illustrative purposes could be made without departing from the true spirit or intention of this invention. It is to be understood, therefore, that the invention should be deemed limited only by the scope of the claims that follow.

Having thus described the invention, what is claimed as new and desired to be secured by Letters Patent is:

1. In apparatus for testing electrical circuits, the combination of: an electrical power source; electrically responsive, circuit condition detecting means; a plurality of external circuit selection units, each of said units including a plurality of terminals adapted for electrical coupling with terminations of external circuits to be tested and switching equipment for automatically and successively effecting a pair of electrical connections to differing combinations of said terminals of the corresponding unit, each of said units including advancing means operably coupled with said equipment for automatically switching said connections successively to different combinations of said terminals in predetermined order, a certain one of said terminals of each of said units being adapted for coupling with the input terminal of a particular external circuit, a certain plurality of others of said terminals of each of said units being adapted for coupling with different output terminals of the same particular external circuit, said advancing means of each of said units being arranged for switching one of said connections successively to different of said other terminals while the other of said connections is maintained to said one terminal; circuit means for each of said units respectively adapted for electrically coupling one of said pair of connections thereof with said power source and the other of said pair of connections thereof with said detecting means; and switching means including parts coupled with each of said circuit means respectively for selectively rendering the latter operably conductive for individual, successive operation of said units.

2. In apparatus as set forth in claim 1, wherein said switching means includes: a stepping switch having a pole piece, a contact engageable by said pole piece for each of said units respectively, and electrically responsive structure operably coupled with said pole piece for shifting the latter into selective engagement with said contacts said pole piece and said contacts being operably coupled electrically with said circuit means.

3. In apparatus as set forth in claim 2, wherein is provided a relay switch for each circuit means respectively coupled with the latter between the corresponding unit and said detecting means, and an operating coil for each of said relay switches operably coupled with the latter, said contacts being coupled with corresponding of said coils, said pole piece being coupled with said power source.

4. In apparatus as set forth in claim 1, wherein is provided means for coupling said one terminal of one of said units with said one terminal of another of said units, whereby an external circuit having its input termination coupled with said one terminal of said one unit and certain of its output terminations coupled with said other terminals of said other unit may be tested.

5. In apparatus as set forth in claim 1, wherein said advancing means of at least one of said units is arranged for effecting a third electrical connection to a specific terminal of said other terminals of said one unit, and there is provided additional circuit means for electrically coupling said third connection with said detecting means, whereby an external circuit having its input termination coupled with said specific terminal and certain of its output terminations coupled with other of said other terminals may be tested.

6. In apparatus for testing electrical circuits, the combination of: an electrical power source; electrically responsive, circuit condition detecting means; a plurality of external circuit selection units, each of said units including a plurality of terminals adapted for electrical coupling with terminations of external circuits to be tested and switching equipment for automatically and successively effecting a pair of electrical connections to differing combinations of said terminals of the corresponding unit; circuit means for each of said units respectively adapted for electrically coupling one of said pair of connections thereof with said power source and the other of said pair of connections thereof with said detecting means; switching means including parts coupled with each of said circuit means respectively for selectively rendering the latter operably conductive for individual, successive operation of said units; and means coupled with said detector unit for momentarily applying to the latter an artificial, circuit fault indicating signal initially upon effectuation of said equipment of said connections with any particular combination of said terminals.

References Cited in the file of this patent

UNITED STATES PATENTS

| | | |
|---|---|---|
| 2,762,014 | Anderson | Sept. 4, 1956 |
| 2,849,677 | Hannon | Aug. 26, 1958 |
| 2,849,678 | Hannon | Aug. 26, 1958 |
| 2,892,153 | Neill | June 23, 1959 |